(12) United States Patent
Lee et al.

(10) Patent No.: US 11,610,431 B2
(45) Date of Patent: Mar. 21, 2023

(54) FINGERPRINT AUTHENTICATION DEVICE, DISPLAY DEVICE INCLUDING THE SAME, AND METHOD OF AUTHENTICATING FINGERPRINT

(71) Applicant: SAMSUNG DISPLAY CO., LTD., Yongin-si (KR)

(72) Inventors: Soon Gyu Lee, Yongin-si (KR); Jin Woo Kim, Yongin-si (KR); Jin A Kang, Yongin-si (KR); Chung Won Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/215,531

(22) Filed: Mar. 29, 2021

(65) Prior Publication Data
US 2022/0027598 A1 Jan. 27, 2022

(30) Foreign Application Priority Data
Jul. 27, 2020 (KR) .................. 10-2020-0093316

(51) Int. Cl.
*G06V 40/12* (2022.01)
(52) U.S. Cl.
CPC ...... *G06V 40/1388* (2022.01); *G06V 40/1365* (2022.01)
(58) Field of Classification Search
CPC .............. G06V 40/1388; G06V 40/1365
See application file for complete search history.

(56) References Cited

U.S. PATENT DOCUMENTS

| | | | |
|---|---|---|---|
| 10,121,054 B2 | 11/2018 | Krishnapura et al. | |
| 10,318,791 B2 | 6/2019 | He et al. | |
| 2009/0046903 A1 | 2/2009 | Corcoran et al. | |
| 2011/0242304 A1* | 10/2011 | Ichige | G06V 40/1382 |
| | | | 348/E7.085 |
| 2017/0032176 A1 | 2/2017 | Higuchi | |
| 2019/0019000 A1* | 1/2019 | Lee | G02B 5/20 |
| 2020/0387684 A1* | 12/2020 | Setlak | H01L 27/3234 |
| 2020/0401782 A1* | 12/2020 | Cheng | G06V 40/1388 |
| 2020/0401783 A1* | 12/2020 | Akhbari | G06V 40/1394 |
| 2020/0410202 A1* | 12/2020 | Lin | G06V 40/1394 |
| 2021/0064842 A1* | 3/2021 | Östlund | G06V 40/1318 |
| 2021/0133423 A1* | 5/2021 | Zhang | G02F 1/136209 |
| 2021/0383089 A1* | 12/2021 | Ye | G06V 40/1318 |

FOREIGN PATENT DOCUMENTS

| | | |
|---|---|---|
| CN | 211062054 | 7/2020 |
| EP | 3657381 | 5/2020 |
| KR | 10-2009000 | 8/2019 |
| KR | 10-2019-0121604 | 10/2019 |
| KR | 10-2158811 | 9/2020 |
| WO | 2020073900 | 4/2020 |

* cited by examiner

*Primary Examiner* — Lixi C Simpson
(74) *Attorney, Agent, or Firm* — F. Chau. & Associates, LLC

(57) ABSTRACT

A display device includes a display panel and a fingerprint authentication device disposed under the display panel. The fingerprint authentication device includes a sensor device and an optical filter. The sensor device includes a first area and a second area in a plan view and sensing light passing through the display panel. The optical filter is disposed between the display panel and the sensor device, overlaps the first area and does not overlap the second area in the plan view, and blocks the light of a certain wavelength range.

19 Claims, 24 Drawing Sheets

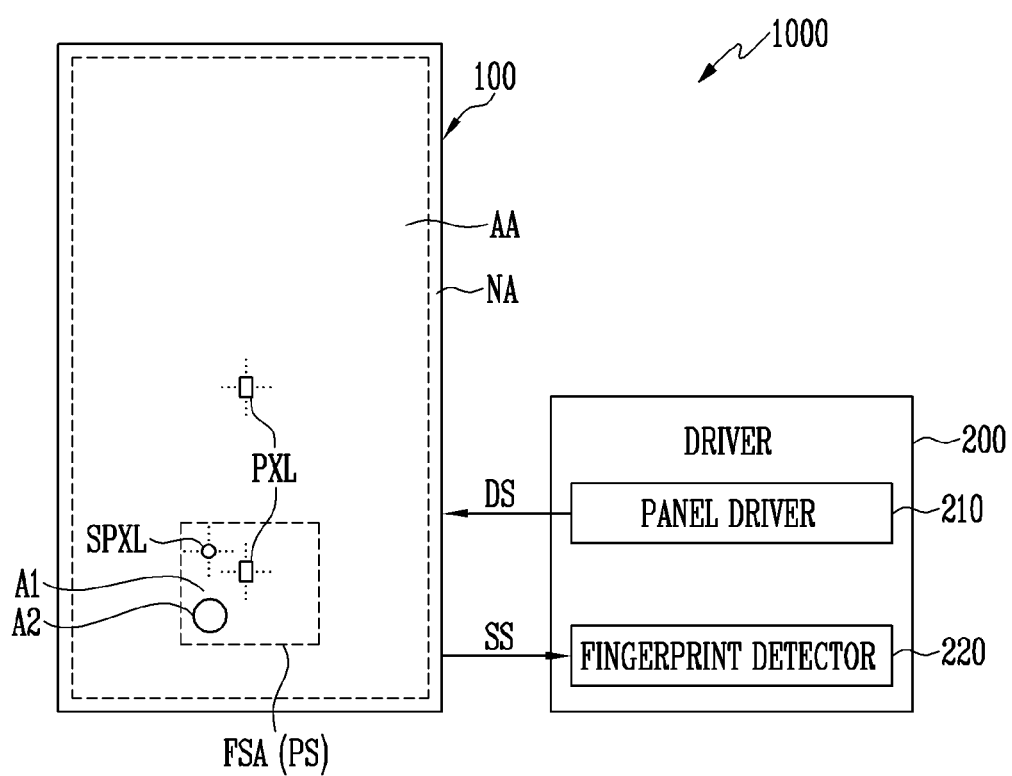

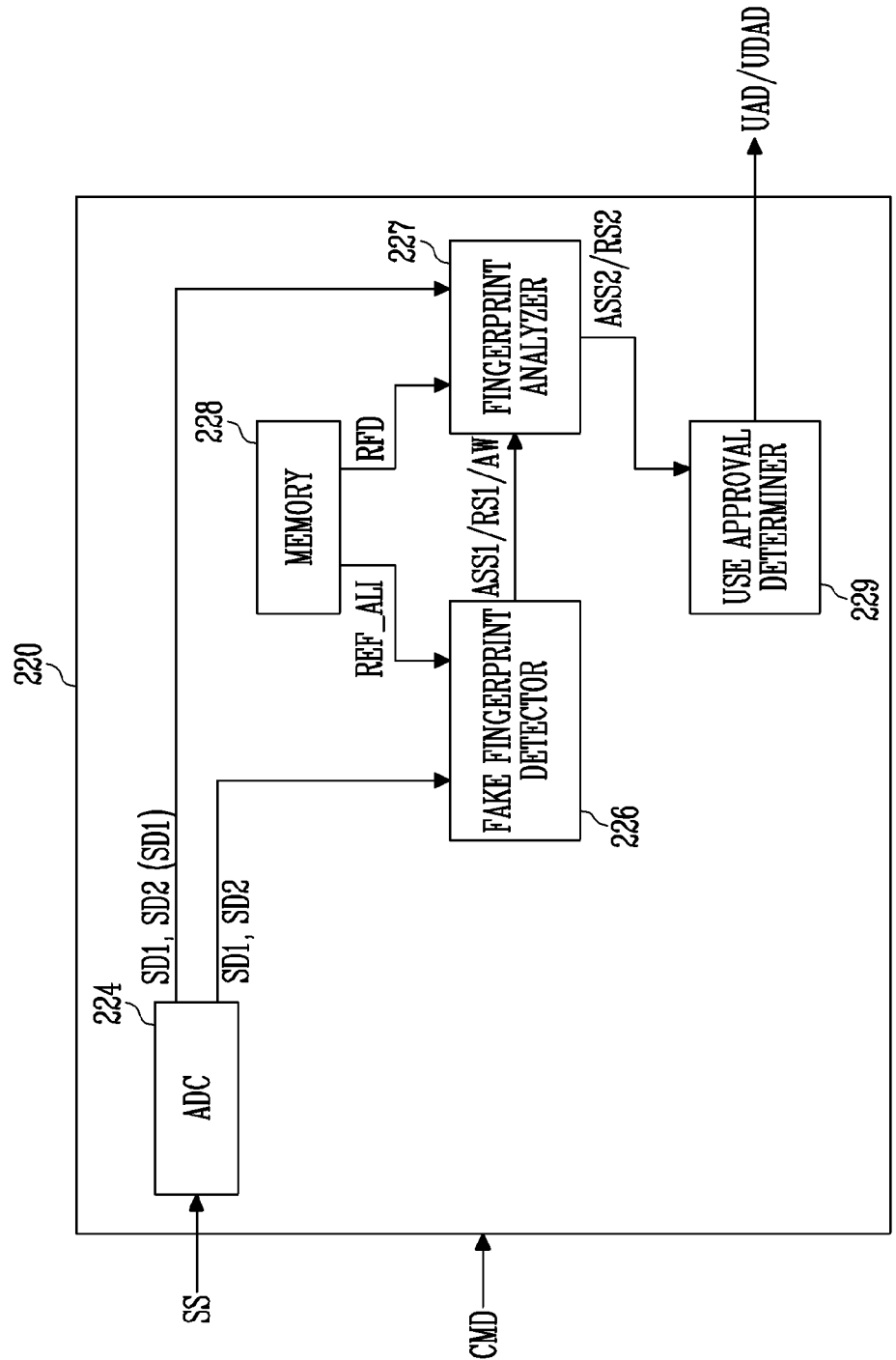

FIG. 9

LUT

| Color | R | G | B | RATIO OF R (R / (G+B)) |
|---|---|---|---|---|
| Dark Skin | 115 | 82 | 68 | 0.766667 |
| Light Skin | 194 | 150 | 130 | 0.692857 |
| Blue Sky | 98 | 122 | 157 | 0.35125 |
| Foliage | 87 | 108 | 67 | 0.497143 |
| Blue Flower | 133 | 128 | 177 | 0.436066 |
| Bluish Green | 103 | 189 | 170 | 0.28691 |
| Orange | 214 | 126 | 44 | 1.258824 |
| Purple Red | 80 | 91 | 166 | 0.31128 |
| Moderate Red | 193 | 90 | 99 | 1.021164 |
| Purple | 94 | 60 | 108 | 0.559524 |
| Yellow Green | 157 | 188 | 64 | 0.623016 |
| Orange Yellow | 224 | 163 | 46 | 1.07177 |
| Blue | 56 | 61 | 150 | 0.2654 |
| Green | 70 | 148 | 73 | 0.31674 |
| Red | 175 | 54 | 60 | 1.535088 |
| Yellow | 231 | 199 | 31 | 1.004348 |
| Magenta | 187 | 86 | 149 | 0.795745 |
| Cyan | 8 | 133 | 161 | 0.02721 |
| White | 243 | 243 | 242 | 0.50103 |
| Neutral 8 | 200 | 200 | 200 | 0.5 |
| Neutral 65 | 160 | 160 | 160 | 0.5 |
| Neutral 5 | 122 | 122 | 121 | 0.502058 |
| Neutral 35 | 85 | 85 | 85 | 0.5 |
| Black | 52 | 52 | 52 | 0.5 |

FINGERPRINT AUTHENTICATION DEVICE, DISPLAY DEVICE INCLUDING THE SAME, AND METHOD OF AUTHENTICATING FINGERPRINT

CROSS-REFERENCE TO RELATED APPLICATION

This U.S. non-provisional patent application claims priority under 35 U.S.C. § 119 to Korean Patent Application No. 10-2020-0093316, filed on, Jul. 27, 2020, the disclosure of which is incorporated by reference in its entirety herein.

1. TECHNICAL FIELD

The disclosure relates to a fingerprint authentication device, a display device including the same, and a method of authenticating a fingerprint.

2. DISCUSSION OF RELATED ART

Display devices such as smartphones and tablet personal computers (PCs) may be accessed after authenticating biometric information of a user such as a fingerprint. A fingerprint sensor to sense the biometric information may be embedded within the display device or attached to a portion of the display device. A display device that includes such a fingerprint sensor may be referred to as a fingerprint sensor integrated type display device or a fingerprint on display (FoD).

The FoD may be used in a field where security is important, such as e-commerce where financial transactions occur. A forged fingerprint (hereinafter referred to as a 'fake fingerprint') may be used to make unauthorized purchases. Therefore, in addition to providing technology that recognizes a fingerprint more accurately, it is useful to provide technology that is capable of effectively distinguishing between the forged fingerprint and a registered user's own fingerprint.

SUMMARY

At least one object of the disclosure is to provide a fingerprint authentication device capable of detecting a fake fingerprint, a display device including the same, and a method of authenticating a fingerprint.

A display device according to an embodiment of the disclosure includes a display panel, a sensor device disposed under the display panel, and a first optical filter. The sensor device includes a first area and a second area in a plan view. The sensor device is for sensing light passing through the display panel. The first optical filter is disposed between the display panel and the sensor device, overlaps the first area and does not overlap the second area in the plan view. The first optical filter blocks the light of a first wavelength range.

According to an embodiment, the first optical filter blocks the light of a wavelength range of about 600 nm or more.

According to an embodiment, the display device further includes a detection circuit (e.g., a fingerprint detector) for determining whether a sensed fingerprint corresponding to a sensing signal is a fake fingerprint, based on a first sensing signal corresponding to the first area and a second sensing signal corresponding to the second area among the sensing signals provided from the sensor device.

According to an embodiment, the first area surrounds the second area in the plan view, and the first optical filter includes at least one opening corresponding to the second area.

According to an embodiment, the first optical filter includes a plurality of openings corresponding to the second area, and the openings are spaced apart from each other with a first separation distance in the plan view so that at least one of the openings corresponds to the sensed fingerprint.

According to an embodiment, the display device further includes an optical lens disposed on the first optical filter and overlapping the first area and the second area in the plan view.

According to an embodiment, the display device further includes an optical lens disposed between the first optical filter and the sensor device and overlapping the first area and the second area in the plan view.

According to an embodiment, the detection circuit (e.g., a fingerprint detector) calculates a ratio of the light of the first wavelength range based on a first light amount corresponding to the first sensing signal and a second light amount corresponding to the second sensing signal, and determines that the sensed fingerprint is the fake fingerprint when the ratio of the light is outside a reference range.

According to an embodiment, the reference range is varied according to an intensity of external light.

According to an embodiment, the display device further includes a second optical filter disposed between the display panel and the sensor device, overlapping the second area in the plan view, and transmitting the light of the first wavelength range.

According to an embodiment, the detection circuit (e.g., a fingerprint detector) calculates a ratio of a first light amount corresponding to the first sensing signal to a second light amount corresponding to the second sensing signal, and determines that the sensed fingerprint is the fake fingerprint when the ratio is outside a reference range.

According to an embodiment, the second area is positioned at one side of the first area in the plan view, and the first optical filter covers the sensor device in the first area and exposes the sensor device in the second area in the plan view.

A fingerprint authentication device according to an embodiment of the disclosure includes a sensor device and a first optical filter. The sensor device includes a first area and a second area in a plan view. The sensor device is for sensing light reflected by a fingerprint. The first optical filter is disposed on the sensor device. The first optical filter overlaps the first area in the plan view, does not overlap the second area in the plan view, and blocks the light of a first wavelength range.

According to an embodiment, the first optical filter blocks the light of a wavelength range of about 600 nm or more.

According to an embodiment, the fingerprint authentication device further includes a detection circuit (e.g., a fingerprint detector) for determining whether a sensed fingerprint corresponding to a sensing signal is a fake fingerprint, based on a first sensing signal corresponding to the first area and a second sensing signal corresponding to the second area among the sensing signals provided from the sensor device.

According to an embodiment of the disclosure, the fingerprint authentication device further includes an optical lens disposed on the sensor device and overlapping the first area and the second area in the plan view.

In an embodiment of the disclosure, a method of authenticating a fingerprint is performed in a fingerprint authentication device including a sensor device including a first area and a second area in a plan view and sensing light, and a first optical filter disposed on the sensor device, overlapping the first area in the plan view and non-overlapping the second area in the plan view, and blocking the light of a first wavelength range. The method includes generating sensing data including first sensing data corresponding to the first area and second sensing data corresponding to the second area, through the sensor device, and determining whether a sensed fingerprint corresponding to the sensing data is a fake fingerprint based on the first sensing data and the second sensing data.

According to an embodiment, determining whether the sensed fingerprint is the fake fingerprint includes calculating a ratio of the light of the first wavelength range based on the first sensing data and the second sensing data, determining a result indicating whether the ratio of the light is outside a reference range, and outputting the result.

According to an embodiment, the method further includes generating a fingerprint image through by performing image processing on the sensing data, comparing the fingerprint image with a registered fingerprint image, and determining whether to approve a function based on the result and a comparison result of the comparing.

According to an embodiment, the method further includes generating a fingerprint image by performing image processing on the sensing data, comparing the fingerprint image with a registered fingerprint image based on the result, and determining whether to approve a function based on a comparison result of the comparing.

A fingerprint authentication device, a display device including the same, and a method of authenticating a fingerprint according to embodiments of the disclosure may estimate a ratio of light of a long wavelength or a color of a sensed fingerprint based on a first sensing signal corresponding to a first area of sensor device of the display device where the light of the long wavelength is blocked and a second sensing signal corresponding to a second area of the sensor device through which the light of the long wavelength is transmitted, and detect a fake fingerprint based on the ratio or the color. Therefore, accuracy and reliability of fingerprint detection may be improved without increasing a manufacturing cost and/or without requiring a complex configuration.

A display device according to an embodiment of the disclosure includes a light emitting layer, an optical lens, an optical filter, an optical filter, a plurality of first sensor pixels, a plurality of second sensor pixels, and a controller. The optical lens is disposed on the light emitting layer. The optical filter includes a first area configured to block light having a first wavelength greater than a pre-defined threshold wavelength, and a second area configured to permit transmission of light above the first wavelength. The first sensor pixels are disposed on the optical filter in the first area, and configured to output a first sensing signal. The second sensor pixels are disposed on the optical filter in the second area, and configured to output a second sensing signal. The controller is configured to determine whether a sensed fingerprint is a fake based on the first and second sensing signals.

In an embodiment, the controller determines a first light amount from the first sensing signal, determines a second light amount from the second sensing signal, subtracts the first amount from the second amount to calculate a third amount, determines a ratio from the first and third amounts, and determines the sensed fingerprint to be the fake when the ratio differs from a pre-defined ratio by more than a threshold amount. In an embodiment, the second area permits transmission of light at and below the first wavelength.

BRIEF DESCRIPTION OF THE DRAWINGS

The invention will become more apparent by describing in further detail embodiments thereof with reference to the accompanying drawings, in which:

FIG. 1A is a block diagram schematically illustrating a display device according to an embodiment of the disclosure;

FIGS. 8A and 8B are block diagrams illustrating an example of a fingerprint detector included in the display device of FIG. 1A;

FIG. 9 is a diagram illustrating a lookup table for describing a reference range used in the fingerprint detector of FIGS. 8A and 8B;

DETAILED DESCRIPTION OF THE EXEMPLARY EMBODIMENTS

Figure 1B:
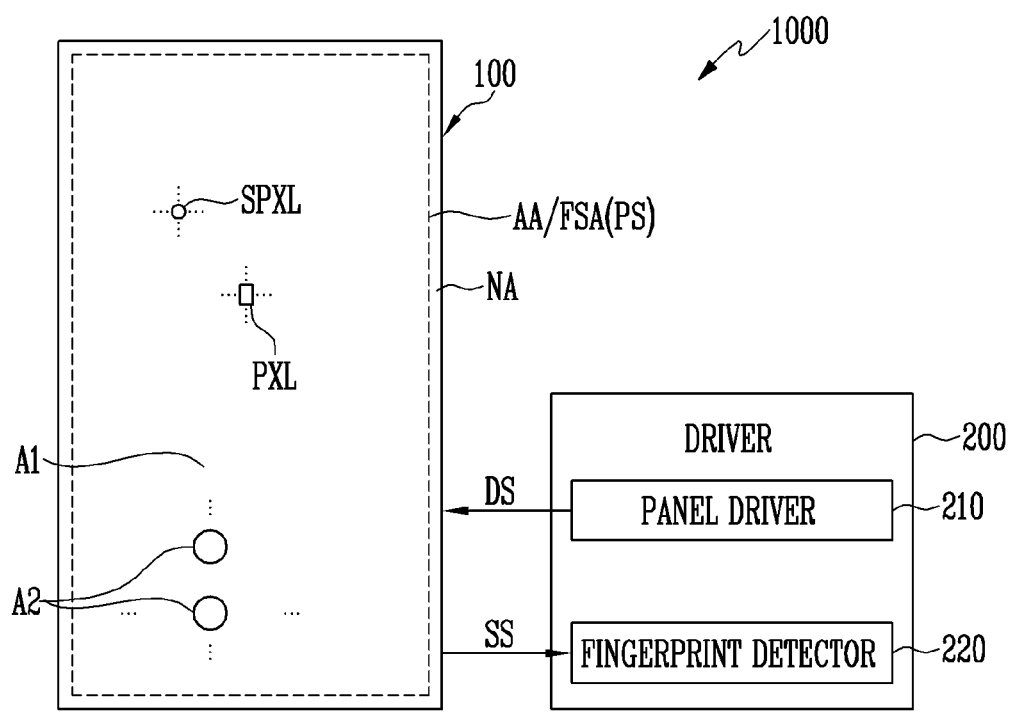
FIG. 1B is a block diagram schematically illustrating another example of the display device of FIG. 1A.

Hereinafter, various embodiments of the disclosure will be described in detail with reference to the accompanying drawings. However, the disclosure may be implemented in various different forms and is not limited to the embodiments described herein.

In the drawings, the same reference numerals are given to the same elements. Therefore, the above-described reference numerals may be used in other drawings.

Embodiments of the disclosure are not necessarily limited to sizes and thicknesses of components shown in the drawings.

FIG. 1A is a block diagram schematically illustrating a display device according to an embodiment of the disclosure. FIG. 1B is a block diagram schematically illustrating another example of the display device of FIG. 1A.

For convenience, in FIGS. 1A and 1B, a display panel 100 and a driver 200 (e.g., a driver circuit) are separate from each other, but the disclosure is not limited thereto. More specifically, all or a part of the driver 200 may be integrally implemented on the display panel 100.

Referring to FIGS. 1A and 1B, the display device 1000 may include the display panel 100 and the driver 200. The driver 200 may include a panel driver 210 (e.g., a driver circuit) and a fingerprint detector 220 (e.g., a detector circuit).

All or at least a portion of the display device 1000 may have flexibility.

The display panel 100 includes a display area AA and a non-display area NA. The display area AA is an area where a plurality of pixels PXL (which may be referred to as sub pixels) are provided, and may be referred to as an active area. In an embodiment, each of the pixels PXL includes at least one light emitting element (e.g., a light source such as an organic light emitting diode). The display device 1000 displays an image on the display area AA by driving the pixels PXL in correspondence with externally input image data.

In an embodiment, the display area AA includes a fingerprint sensing area FSA. The fingerprint sensing area FSA may include at least some of the pixels PXL provided in the display area AA.

In an embodiment, as shown in FIG. 1A, at least a portion of the display area AA is set as the fingerprint sensing area FSA. For example, the display area AA may include a first area having the fingerprint sensing area FSA and a second area different from the first area that excludes the fingerprint sensing area FSA.

In another embodiment, as shown in FIG. 1B, the entire display area AA is set as the fingerprint sensing area FSA. In this case, when performing fingerprint sensing, a fingerprint sensing operation may be performed only in a portion where a touch of a user is substantially performed.

Meanwhile, although FIG. 1A shows an example in which only one fingerprint sensing area FSA is formed on the display area AA, the disclosure is not limited thereto. For example, a plurality of regularly or irregularly arranged or shaped fingerprint sensing areas FSA may be formed on the display area AA.

In addition, while FIG. 1A shows an example in which the fingerprint sensing areas FSA is formed in at least a portion of the display area AA, the disclosure is not limited thereto. That is, in various embodiments, the display area AA and the fingerprint sensing areas FSA may be provided so as to overlap only at least portions of the display area AA and the sensing area SA.

The non-display area NA is an area disposed around the display area AA and may be referred to as a non-active area. For example, the non-display area NA may include a line area, a pad area, or various dummy areas.

In an embodiment, the display device 1000 further includes a plurality of sensor pixels SPXL provided in the fingerprint sensing area FSA. The sensor pixels SPXL may be configured as a light sensor PS for sensing light. In an embodiment, when light emitted from a light source (or the pixel PXL) provided in the display device 1000 is reflected by a finger of the user, the sensor pixels SPXL sense the reflected light and output a corresponding electrical signal (for example, a voltage signal). The electrical signal may be transferred to the driver 200 (for example, a fingerprint detector 220) and used for fingerprint sensing. Hereinafter, the disclosure is described with respect to an example in which the sensor pixels SPXL are used for the fingerprint sensing, but the sensor pixels SPXL may be used for performing various functions such as a touch sensor or a scanner.

When the sensor pixels SPXL are disposed in the fingerprint sensing area FSA in a plan view, the sensor pixels SPXL may overlap the pixels PXL or may be disposed around the pixels PXL. For example, some or all of the sensor pixels SPXL may overlap the pixels PXL or may be disposed between the pixels PXL. In various embodiments, the sensor pixels SPXL and the pixels PXL may have the same or different sizes. Relative size and arrangement between the sensor pixels SPLX SPXL and the pixels PXL are not limited to any particular configuration.

When the sensor pixels SPXL are disposed adjacently to the pixels PXL or at least a portion of the sensor pixels SPXL overlaps the pixels PXL, the sensor pixels SPXL may use a light emitting element provided in the pixel PXL as a light source. In such an embodiment, the sensor pixels SPXL may configure a fingerprint sensor (or a light sensor PS) of a light sensing method together with the light emitting elements provided in the pixels PXL. As described above, when a fingerprint sensor embedded type display device is configured by using the pixels PXL as the light source without a separate external light source, a module thickness of the fingerprint sensor of the light sensing method and the display device including the fingerprint sensor may be reduced, and a manufacturing cost may be reduced.

In an embodiment, the sensor pixels SPXL are disposed on a first surface (for example, a back surface) opposite to a second surface (for example, a front surface) on which an image is displayed among both surfaces of the display panel 100. However, embodiments of the disclosure are not limited thereto.

In an embodiment, the fingerprint sensing area FSA (or the light sensor PS) includes a first area A1 and a second area A2 in the plan view. In FIG. 1A, the second area A2 is surrounded by the first area A1, but the second area A2 is not limited thereto. A disposition of the first area A1 and the second area A2 is described later with reference to FIGS. 4A, 6A, and 7A. In addition, in FIG. 1A, one second area A2 is positioned in the fingerprint sensing area FSA, but the second area A2 is not limited thereto. For example, as shown in FIG. 1B, a plurality of second areas A2 may be arranged in the fingerprint sensing area FSA according to a size of the fingerprint sensing area FSA.

In an embodiment of the disclosure, the light sensor PS includes a first optical filter (or a selective light blocking film) that blocks light of a specific wavelength range, the first optical filter is provided in the first area A1, and the first optical filter is not provided in the second area A2. For example, the first optical filter may be a band pass filter that blocks light of a wavelength of about 600 nm or more (for example, red light, and infrared light) or about 500 nm or more (for example, green light, red light, and infrared light), or transmits light of a wavelength of about 600 nm or less or about 500 nm or less. In this case, the sensor pixels SPXL (or a portion of the light sensor PS) provided in the first area A1 on the plane sense light except for light of a long wavelength (for example, the light of the wavelength of about 600 nm or less or about 500 nm or less) or a light amount corresponding thereto. The sensor pixels SPXL (or the rest of the light sensor PS) provided in the second area A2 on the plane sense light including light of the long wavelength (for example, light including visible light and infrared light) or a light amount corresponding thereto. In an embodiment, the first area A1 is an area where light of a specific wavelength range is blocked, and the second area A2 is an area through which light of a specific wavelength range is transmitted. For example, light of the specific wavelength may pass through the second area A2 without being blocked.

In the current embodiment, the first optical filter is not provided in the second area A2, but the first optical filter is not limited thereto. For example, as will be described later with reference to FIG. 5B, a second optical filter that transmits only light of a specific wavelength range (for example, a long wavelength of about 600 nm or more or about 500 nm or more) may be disposed in the second area A2. In this case, the sensor pixels SPXL (or the rest of the light sensor PS) provided in the second area A2 on the plane may sense the light of the long wavelength or the light amount corresponding thereto.

The driver 200 drives the display panel 100. For example, the driver 200 may output a data signal DS corresponding to image data to the display panel 100. In addition, the driver 200 may output a driving signal for the sensor pixel SPXL and may receive electrical signals (for example, a sensing signal SS) from the sensor pixels SPXL based on the driving signal. The driver 200 may detect a fingerprint type of the user using the received electrical signals to detect a fake fingerprint.

In an embodiment, the driver 200 includes the panel driver 210 and the fingerprint detector 220. For convenience, in FIGS. 1A and 1B, the panel driver 210 and the fingerprint detector 220 are separate from each other, but the disclosure is not limited thereto. For example, at least a portion of the fingerprint detector 220 may be integrated with the panel driver 210 or may operate in conjunction with the panel driver 210.

The panel driver 210 may supply a data signal DS corresponding to the image data to the pixels PXL while sequentially scanning the pixels PXL of the display area AA. Then, the display panel 100 may display the image corresponding to the image data. In an embodiment, the sequentially scanning includes providing a data signal DS to a first row of the pixels PXL, and then repeating this for each next row of the pixels PXL, until all pixel rows have received image data.

In an embodiment, the panel driver 210 may supply a driving signal for the fingerprint sensing to the pixels PXL. The driving signal may be provided so that the pixels PXL emit light and operate as the light source for the sensor pixels SPXL. In such an embodiment, the driving signal for the fingerprint sensing may be provided to the pixels PXL provided in a specific area within the display panel 100 (for example, the pixels PXL provided in the fingerprint sensing area FSA).

In another embodiment, the driving signal for the fingerprint sensing may be provided by the fingerprint detector 220.

The fingerprint detector 220 may transfer a driving signal (for example, a driving voltage) for driving the sensor pixels SPXL to the sensor pixels SPXL, and may detect the fingerprint of the user based on the electrical signals received from the sensor pixels SPXL. For example, the fingerprint detector 220 may perform fingerprint authentication and fake fingerprint detection (that is, perform an operation to determine whether the sensed fingerprint is a fake fingerprint) based on the sensing signal SS supplied from the sensor pixels SPXL (for example, light sensors PS). The sensor pixels SPXL and the fingerprint detector 220 may correspond to a fingerprint authentication device FDD, a fingerprint sensing device, or a fingerprint sensor.

In an embodiment, the fingerprint detector 220 determines whether the sensed fingerprint is the fake fingerprint based on a first sensing signal supplied from the sensor pixels SPXL in the first area A1 and a second sensing signal supplied from the sensor pixels SPXL in the second area A2.

The first sensing signal corresponding to the first area A1 does not include a light amount for light of a specific wavelength range (for example, the light of the wavelength of about 600 nm or more or about 500 nm or more), however, the second sensing signal includes the light amount for the light of the specific wavelength range. In an embodiment, the first sensing signal only includes light below a certain wavelength and the second sensing signal includes light above the certain wavelength or below the certain wavelength. Accordingly, the fingerprint detector 220 may calculate a ratio of the light (or the light amount) of the specific wavelength range. In addition, the fingerprint detector 220 may estimate a color of the sensed fingerprint (a target object, or an observation object) based on the ratio of the light of the specific wavelength range. Furthermore, the fingerprint detector 220 may determine whether the sensed fingerprint is the fake fingerprint based on the color of the sensed fingerprint or the ratio of the light of the specific wavelength range. For example, when a color of the sensed fingerprint is a skin color, a certain color, or the ratio of the light of the specific wavelength range is within a reference range, the fingerprint detector 220 may determine that the sensed fingerprint is an actual fingerprint. For example, if the ratio does not differ from a pre-defined ratio by more than a threshold amount, the sensed fingerprint may be determined to be the actual fingerprint. As another example, when the color of the sensed fingerprint is a single color such as black, white, or red, or the ratio of the light of the specific wavelength range is outside the reference range, the fingerprint detector 220 may determine that the sensed fingerprint is the fake fingerprint. For example, if the ratio differs from a pre-defined ratio by more than a threshold amount, the sensed fingerprint may be determined to be the fake fingerprint. A configuration for determining the fake fingerprint is described later with reference to FIGS. 8A and 8B.

In an embodiment, the display device 1000 (or the fingerprint authentication device FDD) senses light except for light of the specific wavelength range (for example, the long wavelength of about 600 nm or more or about 500 nm or more) through the first area A1, senses light including the light of the specific wavelength range through the second area A2, calculates the ratio of the light of the specific wavelength range or estimates the color of the sensed fingerprint (or the target object) based on the light amount (or the first sensing signal) corresponding to the first area A1 and the light amount (or the second sensing signal) corresponding to the second area A2, and determines whether the sensed fingerprint is the fake fingerprint based on the ratio of the light of the specific wavelength range or the color of the sensed fingerprint. For example, the fingerprint authentication device FDD may determine whether the sensed fingerprint is the fake fingerprint based on the ratio of the first sensing signal to the second sensing signal.

Figure 2A:
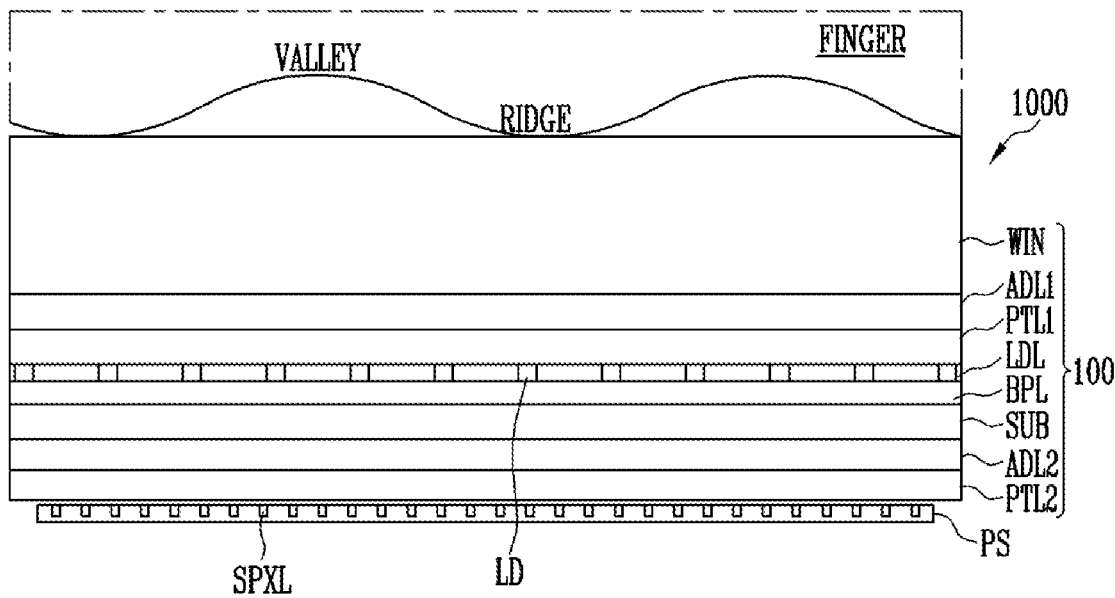
FIG. 2A is a cross-sectional view illustrating an example of the display device of FIG. 1A.

FIG. 2A is a cross-sectional view illustrating an example of the display device of FIG. 1A. Specifically, FIG. 2A shows an example of a cross section in the fingerprint sensing area FSA of the display device 1000 shown in FIGS. 1A and 1B.

Referring to FIGS. 1A to 2A, the display device 1000 includes the display panel 100 and the light sensor PS disposed on one surface of the display panel 100 in the fingerprint sensing area FSA. In an embodiment, the display device 1000 includes a substrate SUB, and a circuit element layer BPL, a light emitting element layer LDL, a first protective layer PTL1, a first adhesive layer ADL1, and a window WIN, which are sequentially disposed on one surface (for example, an upper surface) of the substrate SUB. In addition, the display device 1000 may include a second adhesive layer ADL2 and a second protective layer PTL2 which are sequentially disposed on another surface (for example, a lower surface) of the substrate SUB.

The substrate SUB may be a substantially transparent transmissive substrate such as a base substrate of the display panel 100. The substrate SUB may be a rigid substrate including glass or tempered glass, or a flexible substrate of a plastic material. However, the material of the substrate SUB is not limited thereto, and the substrate SUB may be configured of various materials.

The circuit element layer BPL may be disposed on one surface of the substrate SUB and include at least one conductive layer. For example, the circuit element layer BPL may include a plurality of circuit elements configuring a pixel circuit of the pixels PXL, and lines for supplying various power and signals for driving the pixels PXL. In this case, the circuit element layer BPL may include a plurality of conductive layers for configuring various circuit elements such as at least one transistor and a capacitor, and lines connected thereto. In addition, the circuit element layer BPL may include at least one insulating layer provided between the plurality of conductive layers.

The light emitting element layer LDL may be disposed on one surface of the circuit element layer BPL. The light emitting element layer LDL may include a plurality of light emitting elements LD connected to the circuit elements and/or the lines of the circuit element layer BPL through a contact hole. In an embodiment, at least one of the plurality of light emitting elements LD may be provided for each pixel PXL. For example, the light emitting element LD may be an organic light emitting diode, a micro light emitting diode, or an inorganic light emitting diode such as a quantum dot light emitting diode. In addition, the light emitting element LD may be a light emitting element including a combination of organic and inorganic materials. Furthermore, each of the pixels PXL may include a single light emitting element LD, or in another embodiment, each of the pixels PXL may include a plurality of light emitting elements LD, and the plurality of light emitting elements LD may be connected in series, in parallel, or in series and parallel to each other.

Each of the pixels PXL may be configured of the circuit elements disposed in the circuit element layer BPL and at least one light emitting element LD disposed in the light emitting element layer LDL on the circuit element layer BPL.

The first protective layer PTL1 may be disposed on the light emitting element layer LDL so as to cover the display area AA. The first protective layer PTL1 may include a sealing member such as a thin film encapsulation (TFE) or an encapsulation substrate, and may further include a protective film in addition to the sealing member.

The first adhesive layer ADL1 is disposed between the first protective layer PTL1 and the window WIN to couple the first protective layer PTL1 and the window WIN. The first adhesive layer ADL1 may include a transparent adhesive such as an optically clear adhesive (OCA), and may include various adhesive materials.

The window WIN is a protective member disposed at the uppermost end of the module of the display device 1000 including the display panel 100, and may be a substantially transparent transmissive substrate. The window WIN may have a multilayer structure selected from a glass substrate, a plastic film, and a plastic substrate. The window WIN may include a rigid or flexible substrate, but a configuration material of the window WIN is not limited thereto.

In an embodiment, the display device 1000 further includes a polarizing plate, an antireflection layer, or a touch sensor layer (touch electrode layer). For example, the display device 1000 may further include a polarizing plate and/or a touch sensor layer disposed between the first protective layer PTL1 and the window WIN.

The touch sensor layer may include a plurality of sensing electrodes (or sensing cells). In this case, the driver 200 described with reference to FIG. 1A may sense presence or absence of a touch input and a position (or coordinates) of the touch input based on a change of a capacitance between the sensing electrodes.

The second protective layer PTL2 may be disposed on the other surface of the substrate SUB. The second protective layer PTL2 may be coupled to the substrate SUB by the second adhesive layer ADL2.

The second adhesive layer ADL2 may firmly bond (or attach) the substrate SUB and the second protective layer PTL2. The second adhesive layer ADL2 may include a transparent adhesive such as an OCA. The second adhesive layer ADL2 may include a pressure sensitive adhesive (PSA) in which an adhesive material acts when a pressure for adhesion to an adhesive surface is applied.

The second protective layer PTL2 may block inflow of oxygen or moisture from the outside and may be provided in a form of a single layer or a multilayer. The second protective layer PTL2 may be configured in a film form to further secure flexibility of the display panel 100. The second protective layer PTL2 may be coupled to the light sensor PS through another adhesive layer (not shown) including a transparent adhesive such as an OCA.

The light sensor PS is attached to a rear surface (for example, the back surface) of the display panel 100 through an adhesive to overlap at least one area of the display panel 100. For example, the light sensor PS may be disposed to overlap the display panel 100 in the fingerprint sensing area FSA. The light sensor PS may include a plurality of sensor pixels SPXL dispersed at a predetermined resolution and/or interval.

In embodiments, although not shown, the light sensor PS may include the first optical filter (or, the selective light blocking film) that blocks the light of the specific wavelength range (for example, the long wavelength of about 600 nm or more or about 500 nm or more). A specific configuration of the light sensor PS including the first optical filter is described later with reference to FIG. 4B.

While it has been described that the first optical film is included in the light sensor PS, the disclosure is not limited thereto. For example, the first optical film may be provided under the second protective layer PTL2. That is, when the first optical film is positioned on the sensor pixels SPXL, the first optical film may be included in the light sensor PS or may be separately disposed outside the light sensor PS.

In an embodiment, although not shown, an optical system may be provided, which provides a light path by condensing light directed to the light sensor PS, on the light sensor PS. A width of a light transmission portion that guides light of the optical system may be determined in consideration of sensing precision and light conversion efficiency. A condensing rate of light incident on the light sensor PS may be improved by the optical system. According to an embodiment, the optical system is formed of an optical fiber or silicon.

The sensor pixels SPXL may have an appropriate number, size, and arrangement so that an identifiable fingerprint image may be generated from the electrical signals output from the sensor pixels SPXL. A distance between the sensor pixels SPXL may be densely set so that reflected light reflected from a target object (for example, a fingerprint, or the like) may be incident on at least two adjacent sensor pixels SPXL.

The sensor pixels SPXL may sense external light and output a corresponding electrical signal, for example, a voltage signal. Reflected light received by each of the sensor pixels SPXL may have a light characteristic (for example, a frequency, a wavelength, a size, and the like) due to a valley and a ridge of the fingerprint formed on a finger of the user. Therefore, each of the sensor pixels SPXL may output the sensing signal SS having different electrical characteristics in correspondence with the light characteristic of the reflected light.

In an embodiment, the sensing signal SS output by the sensor pixels SPXL is converted into image data by the fingerprint detector 220 and used for fingerprint identification (that is, fingerprint authentication) of the user. In addition, the fingerprint detector 220 may calculate the ratio of the light of the specific wavelength range or estimate the color of the sensed fingerprint based on the sensing signal SS, and detect the fake fingerprint based on the ratio or the color.

Figure 2B:
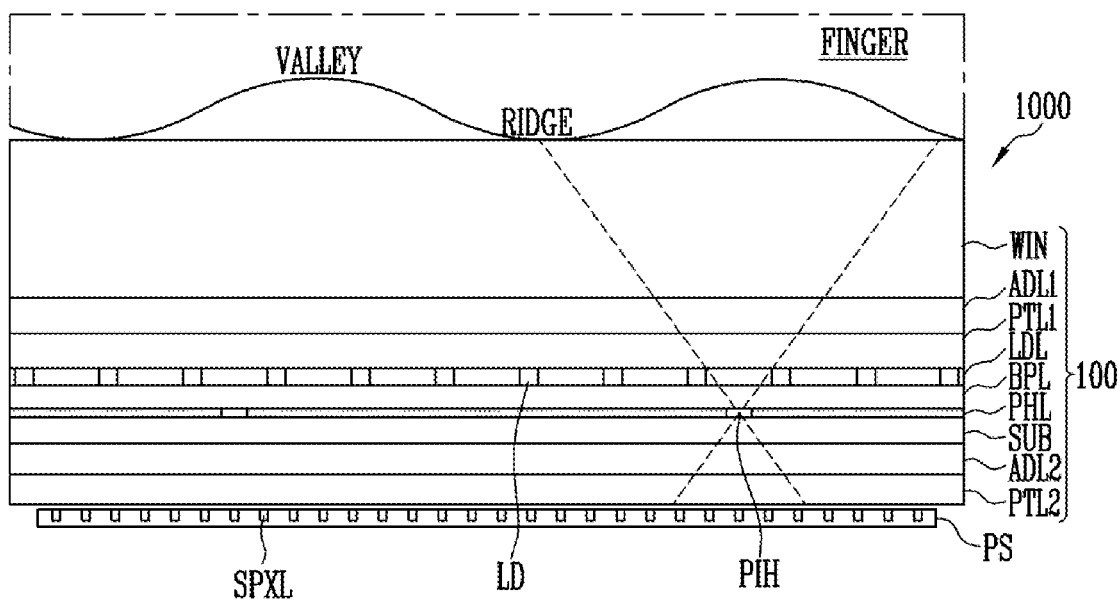
FIG. 2B is a cross-sectional view illustrating another example of the display device of FIG. 1A.

FIG. 2B is a cross-sectional view illustrating another example of the display device of FIG. 1A. Specifically, FIG. 2B shows another example of a cross section in the fingerprint sensing area FSA of the display device 1000 shown in FIGS. 1A and 1B.

Referring to FIGS. 1A, 2A, and 2B, in another embodiment, the display device 1000 further includes a light blocking layer PHL including pinholes PIH. The light blocking layer PHL may be disposed inside the display panel 100 or between the display panel 100 and the sensor pixels SPXL to block some of light incident on the sensor pixels SPXL. For example, some of the light incident on the light blocking layer PHL may be blocked, and a remainder of the light may pass through the pinholes PIH and reach the sensor pixels SPXL under the light blocking layer PHL. The pinholes PIH may operate as the optical system, and may be used together with another optical system.

The pinholes PIH may mean optical holes and may be a kind of light transmitting hole. For example, the pinholes PIH may be a light transmitting hole having a smallest size (or area) among the light transmitting holes where layers of the display device 1000 overlap each other on a path through which the reflected light passes through the display panel 100 in a diagonal or vertical direction and enters the sensor pixels SPXL.

The pinholes PIH may have a width of a range of a predetermined width, for example, 5 μm to 20 μm. In such a manner, a width of the optical opening area to be secured in each layer of the display device 1000 may be gradually increased as a distance from the light blocking layer PHL is increased (that is, as each of distances from an upper portion and a lower portion of the light blocking layer PHL is increased).

The width (or diameter) of the pinholes PIH may be set to about 10 times or more, for example, about 4 μm or 5 μm or more of a wavelength of the reflected light so as to prevent diffraction of light. In addition, the width of the pinholes PIH may be set to a size large enough to prevent image blur and to more clearly sense a shape of the fingerprint. For example, the width of the pinholes PIH may be set to about 15 μm or less. However, the disclosure is not limited thereto, and the width of the pinholes PIH may be changed according to a wavelength band of the reflected light and/or thicknesses of each layer of the sensor module.

Only the reflected light passing through the pinholes PIH may reach the sensor pixels SPXL of the light sensor PS. A phase of the light reflected from the fingerprint by the pinhole PIH of a very narrow width and a phase of an image formed on the light sensor PS may have a difference of 180 degrees.

The sensor pixels SPXL may output the sensing signal SS corresponding to the received reflected light, for example, a voltage signal.

However, this is exemplary, and a configuration, a disposition, a driving method, and the like of the light sensor PS that detects the reflected light from the fingerprint are not limited to the light sensor PS of FIG. 2A or 2B.

Although the light sensor of a pinhole type is shown in FIG. 2B, the disclosure is not limited thereto. For example, a light sensor of a micro lens type or a collimator type may be used.

Figure 3A:
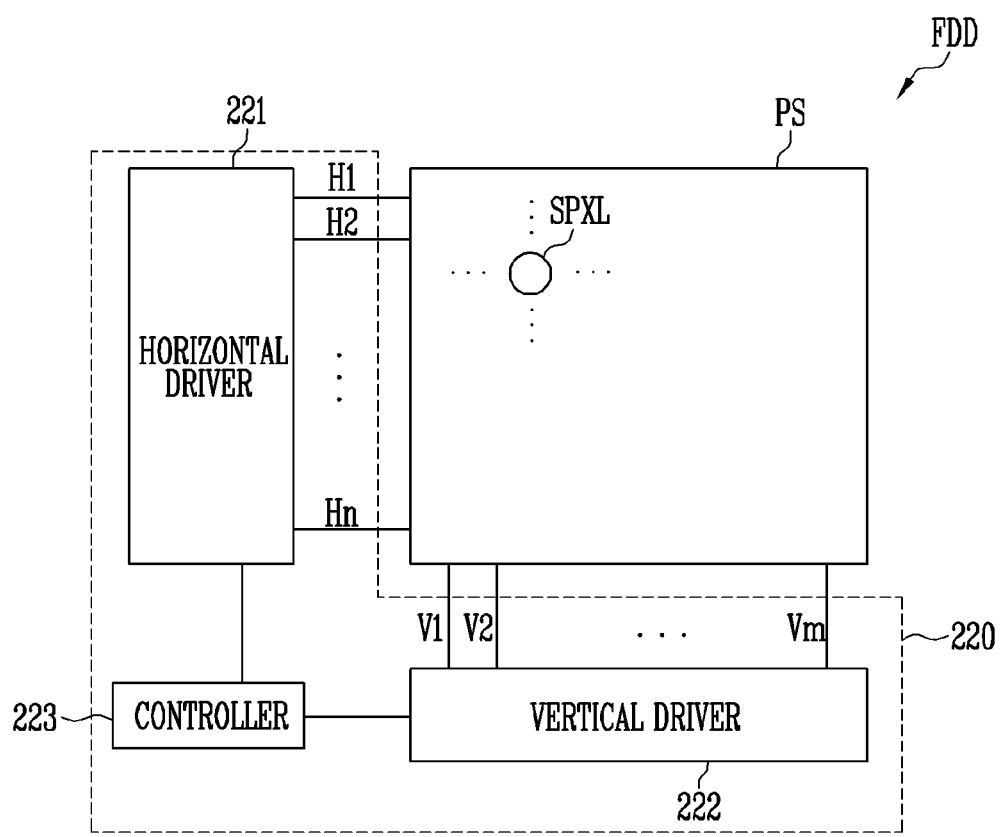
FIG. 3A is a block diagram illustrating an example of a configuration of a fingerprint authentication device included in the display device of FIGS. 1A and 1B.

FIG. 3A is a block diagram illustrating an example of a configuration of the fingerprint authentication device included in the display device of FIGS. 1A and 1B. FIG. 3A shows an example of the fingerprint authentication device FDD included in the display device 1000 of FIGS. 1A and 1B.

Referring to FIGS. 1A to 3A, the fingerprint authentication device FDD includes the light sensor PS and the fingerprint detector 220.

The light sensor PS may include an array of the sensor pixels SPXL. In an embodiment, the sensor pixels SPXL are arranged in a two-dimensional array, but the disclosure is not limited thereto. In an embodiment, each sensor pixel SPXL includes a photoelectric element (e.g., a photodiode) that photoelectrically converts incident light into a charge according to a light amount thereof.

The fingerprint detector 220 includes a horizontal driver 221, a vertical driver 222, and a controller 223 (e.g., a control circuit).

The horizontal driver 221 is connected to the sensor pixels SPXL through driving lines H1 to Hn. The horizontal driver 221 may include a shift register or an address decoder. In various embodiments, the horizontal driver 221 may apply a driving signal to drive selected sensor pixels SPXL among the sensor pixels SPXL. For example, the horizontal driver 221 may apply the driving signal in a sensor pixel row unit.

The sensor pixels SPXL selected and driven by the horizontal driver 221 sense light using the photoelectric element provided in the sensor pixels SPXL, and output the electrical signal (the sensing signal SS), for example, a voltage signal corresponding to the sensed light. The electrical signal output described above may be an analog signal.

The vertical driver 222 is connected to the sensor pixels SPXL through signal lines V1 to Vm. The vertical driver 222 may perform a process on signals output from the sensor pixels SPXL.

For example, the vertical driver 222 may perform a correlated double sampling (CDS) process for removing noise from the received electrical signal. In addition, the vertical driver 222 may convert the analog signal received from the sensor pixels SPXL into a digital signal. In an embodiment, an analog-to-digital converter may be provided for each sensor pixel column, and may process analog signals received from the sensor pixel column in parallel.

The controller 223 controls the horizontal driver 221 and the vertical driver 222.

In an embodiment, the controller 223 generates image data corresponding to the sensing signal SS received from the vertical driver 222 and performs a process of the generated image data. In addition, in an embodiment, the controller 223 may detect a fingerprint from the processed image data, or may authenticate the detected fingerprint, and/or may transmit the detected fingerprint to the outside. For example, the controller 223 may include at least some of the configurations included in the fingerprint detector 220 of FIGS. 8A and 8B, or may perform at least some functions of those configurations.

However, this is exemplary, and the generation of the image data and the fingerprint detection need not be performed by the controller 223, and may instead be performed by an external host processor.

Figure 3B:
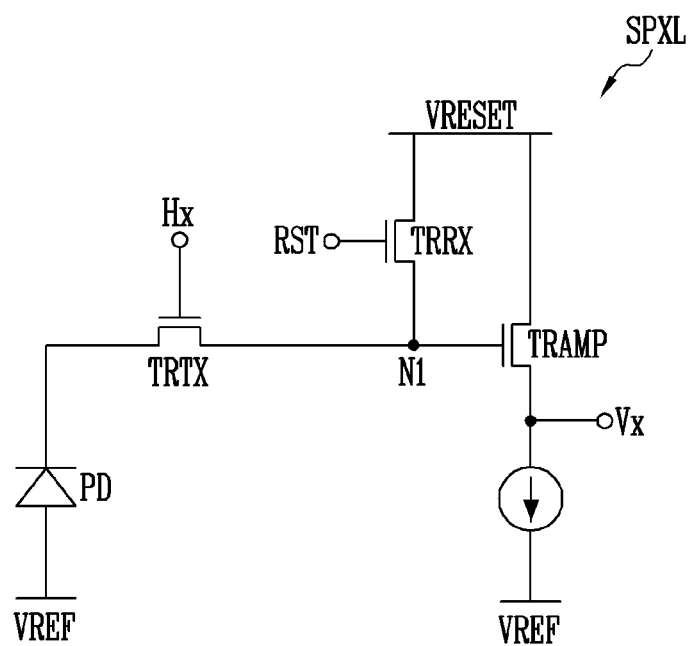
FIG. 3B is a circuit diagram illustrating an example of a sensor pixel included in the fingerprint authentication device of FIG. 3A.

FIG. 3B is a circuit diagram illustrating an example of the sensor pixel included in the fingerprint authentication device of FIG. 3A.

In FIG. 3B, the sensor pixel SPXL disposed in an x-th (where x is a positive integer) sensor pixel row and an x-th sensor pixel column is shown.

Referring to FIGS. 3A and 3B, the sensor pixel SPXL is an example of a photoelectric element, and includes a photodiode PD, a transmission transistor TRTX, a reset transistor TRRX, and an amplifying transistor TRAMP. FIG. 3B shows an example in which the transistors are N-type transistors. However, in various embodiments, at least some of the transistors may be configured of a P-type, and a circuit structure of the sensor pixel SPXL may be variously modified in correspondence therewith.

A reference voltage VREF may be applied to an anode electrode of the photodiode PD. In an embodiment, the anode electrode of the photodiode PD may be grounded. The transmission transistor TRTX is connected between a cathode electrode of the photodiode PD and a first node N1, and a gate electrode of the transmission transistor TRTX is connected to the horizontal driver 221. The transmission transistor TRTX is turned on when a driving signal is applied to the gate electrode of the transmission transistor TRTX through the driving line Hx to operate as a transmission gate portion that transfers a charge photoelectrically converted by the photodiode PD to the first node N1, which is a charge voltage conversion portion.

The reset transistor TRRX is connected between a reset power voltage VRESET and the first node N1, and may receive a reset signal through its gate electrode connected to a reset line RST. When the reset signal is applied, the reset transistor TRRX may be turned on to reset a voltage of the first node N1 to a voltage of the reset power voltage VRESET.

The amplifying transistor TRAMP is connected between the reset power voltage VRESET and the signal line Vx, and a gate electrode of the amplifying transistor TRAMP is connected to the first node N1. The amplifying transistor TRAMP operates as an amplifier that outputs a signal corresponding to the voltage of the first node N1 to a signal line Vx.

However, a structure of the sensor pixel SPXL is not limited to that described above, and the sensor pixel SPXL may include, for example, four or more transistors or two or less transistors.

Figure 4A:
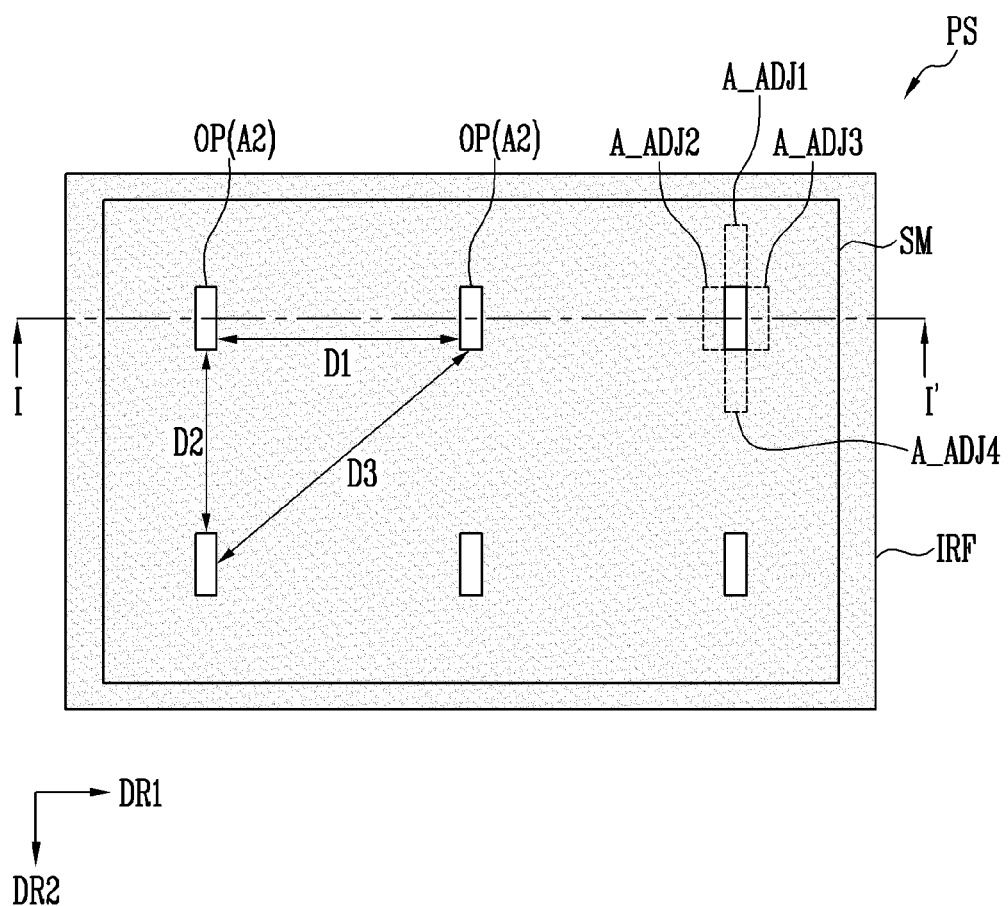
FIG. 4A is a plan view illustrating an example of a light sensor included in the display device of FIG. 1A.
Figure 4B:
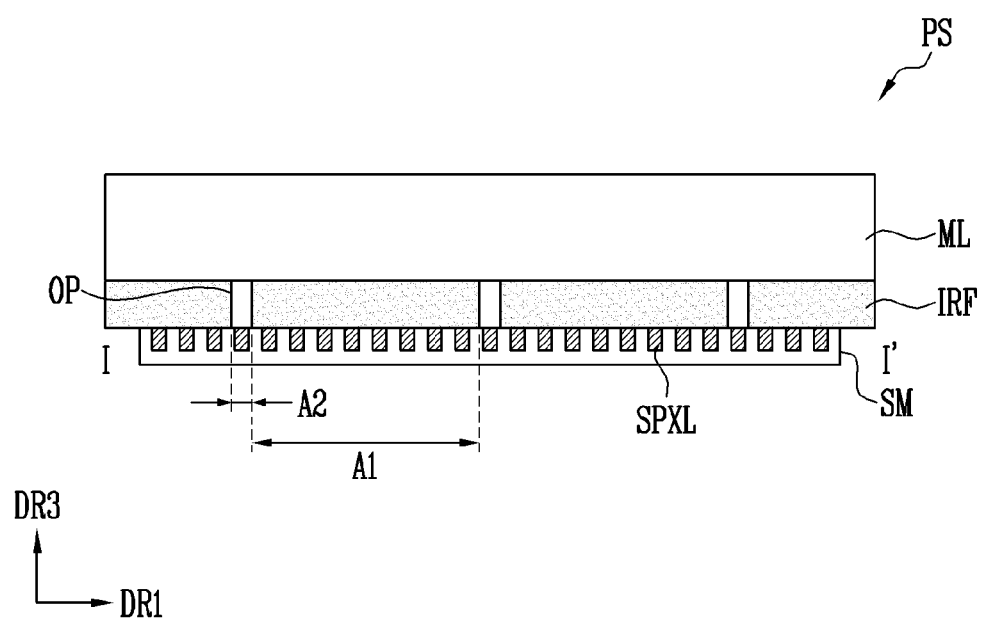
FIG. 4B is a cross-sectional view illustrating an example of the light sensor taken along a line I-I' of FIG. 4A.

FIG. 4A is a plan view illustrating an example of the light sensor included in the display device of FIG. 1A. Specifically, FIG. 4A shows an example of the light sensor PS provided in the fingerprint sensing area FSA of the display device 1000 shown in FIGS. 1A and 1B. FIG. 4B is a cross-sectional view illustrating an example of the light sensor taken along a line I-I' of FIG. 4A.

Referring to FIGS. 1A, 4A, and 4B, the light sensor PS includes a sensor module SM (e.g., a sensor, a sensor device, or a sensing device) and a first optical filter IRF. In addition, the light sensor PS may further include an optical lens ML.

The sensor module SM may include the sensor pixels SPXL. The sensor module SM includes the first area A1 and the second area A2 in the plan view.

In an embodiment, as shown in FIG. 4A, a plurality of second areas A2 are disposed to be spaced apart from each other along a first direction DR1 and a second direction DR2, and the first area A1 surrounds the second areas A2. The first area A1 may be an area except for the second area A2 of the fingerprint sensing area FSA (see FIG. 1A).

The first optical filter IRF is disposed on the sensor module SM. The first optical filter IRF overlaps the sensor module SM in the first area A1 and does not overlap the sensor module SM in the second area A2.

The first optical filter IRF blocks light of a first wavelength range. In an embodiment, the first optical filter IRF blocks the light of the long wavelength of about 500 nm or more or about 600 nm or more. In an embodiment, the first optical filter IRF blocks red and/or orange light.

In an embodiment, openings OP corresponding to the second areas A2 are formed in the first optical filter IRF. In the plan view, the openings OP may overlap each of the second areas A2. That is, the second areas A2 may be defined by the opening OP formed in the first optical filter IRF.

In an embodiment, the openings OPs are disposed to be spaced apart from each other with a specific separation distance in the plan view so that at least one of the openings OP corresponds to the sensed fingerprint.

As shown in FIG. 4A, the openings OP are disposed to be spaced apart by a first separation distance D1 in the first direction DR1. In addition, the openings OP are disposed to be spaced apart by a second separation distance D2 in the second direction DR2 perpendicular to the first direction DR1. According to an embodiment, the second separation distance D2 is the same as the first separation distance D1. Meanwhile, the openings OP may be disposed to be spaced apart by a third separation distance D3 in a diagonal direction crossing each of the first direction DR1 and the second direction DR2.

For example, when a finger of a user touches the light sensor PS (or the display device 1000 including the same, see FIG. 4C), an area where the finger of the user contacts the light sensor PS or the finger of the user is sensed by the light sensor PS may have a diameter of about 1.5 cm. In this case, the first separation distance D1, the second separation distance D2, and the third separation distance D3 may be set within a range of less than 1.5 cm, for example, a range equal to or less than about 1 cm. Accordingly, the area where the finger of the user contacts or the finger of the user is sensed may correspond to at least one opening OP in the plan view, or may include at least one opening OP. Therefore, regardless of a location where the finger of the user is touched, a fake fingerprint determination for the sensed fingerprint may be performed.

In FIG. 4A, while six openings OP arranged in the first direction DR1 and the second direction DR2 are shown, this is exemplary, and the openings OP are not limited thereto. For example, as a size of the light sensor PS increases in the plan view, the number of openings OP may increase, and as the size of the light sensor PS decreases in the plan view, the number of openings OP may decrease. As another example, the openings OP may have the same distance from each other and may be positioned at vertices of a virtual equilateral triangle.

In an embodiment, the area of the openings OP may be about 10% or less, about 5% or less, about 3% or less, or about 1% or less of the area of the first optical filter IRF. As will be described later with reference to FIG. 4C, since light incident on the sensor module SM through the openings OP includes noise, accuracy of the fingerprint sensing may decrease as the area of the openings OP increases.

In an embodiment, the first optical filter IRF covers the sensor module SM in the plan view. As shown in FIG. 4A, the first optical filter IRF may protrude from an edge of the sensor module SM in the first direction DR1 and the second direction DR2. In this case, the light of the long wavelength incident in the diagonal direction (for example, the diagonal direction through which the light is incident through the pinholes PIH described with reference to FIG. 2B) may be blocked.

The optical lens ML is an optical system and may be disposed on the first optical filter IRF. The optical lens ML may condense or focus light directed to the sensor module SM (or the sensor pixels SPXL). For example, the optical lens ML may include convex lenses of a micro size. While the optical lens ML has been described as the optical system, the optical system is not limited thereto. For example, as the optical system, a pinhole or a collimator may be applied, or an optical system in which the optical lens ML, the pinhole, or the collimator, is combined or stacked may be applied.

In an embodiment, the optical lens ML overlaps the first area A1 and the second area A2 in the plan view, and a size of the optical lens ML in the plan view is substantially the same or exactly the same as a size of the first optical filter IRF in the plan view.

Figure 4C:
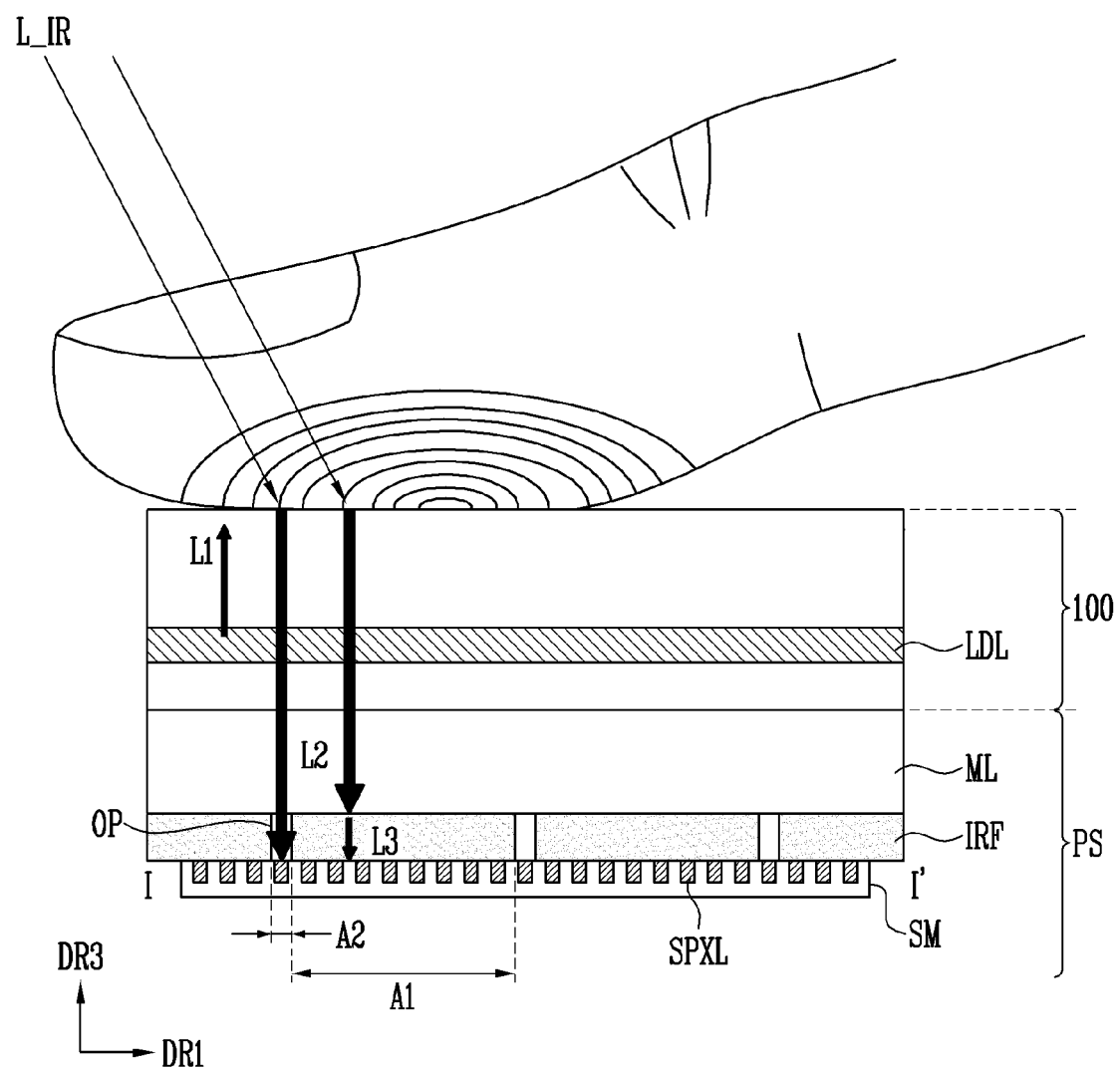
FIG. 4C is a diagram illustrating light incident on a first area and a second area of the light sensor of FIG. 4B.

FIG. 4C may be referred to describe light sensed in the first area A1 and light sensed in the second area A2 of the sensor module SM.

FIG. 4C is a diagram illustrating light incident on the first area and the second area of the light sensor of FIG. 4B. In FIG. 4C, in addition to the light sensor PS of FIG. 4B, the display panel 100 described with reference to FIGS. 2A and 2B are further shown. In FIG. 4C, one sensor pixel SPXL corresponding to the second area A2 is shown, but this is shown for convenience and a plurality of sensor pixels SPXL corresponding to the second area A2 may be provided.

Referring to FIGS. 2A, 2B, and 4A to 4C, first light L1 is emitted from the light emitting element layer LDL in the display panel 100 toward the finger (or target object) of the user. For example, the first light L1 may be visible light of a range of about 400 nm to 700 nm. When the light emitting element layer LDL includes a red pixel emitting red light, a green pixel emitting green light, and a blue pixel emitting blue light, the first light L1 may include red light, green light, and blue light.

At least some of the first light L1 may be reflected by the finger of the user. In addition, external light L_IR (for example, red light and infrared light) of the long wavelength of about 600 nm or more may pass through the finger of the user from the outside and enter the display panel 100. Therefore, second light L2 progressing from the finger of the user toward the light sensor PS may include at least some of the first light L1 and the external light L_IR. That is, the external light L_IR may be included in the second light L2 as noise, and a light amount of the second light L2 may be equal to or similar to a sum of a light amount of the first light L1 and a light amount of the external light L_IR.

Since the first optical filter IRF is disposed in the first area A1, light of a wavelength band corresponding to the external light L_IR is blocked from the second light L2, and a portion of the sensor module SM positioned in the first area A1 senses third light L3. For example, the third light L3 may include light of a wavelength of about 600 nm or less or about 500 nm or less.

For reference, when the first optical filter IRF is entirely disposed on the sensor module SM, the sensor module SM receives only the third light L3 that does not include noise. Accordingly, the valley and the ridge of the fingerprint may be accurately distinguished, and the accuracy of the fingerprint sensing may be improved. However, in this case, the sensor module SM senses only the light of the wavelength of about 600 nm or less (for example, blue light and green light) or about 500 nm or less and does not sense light of a wavelength of about 600 nm or more (for example, red light). Therefore, the color of the finger of the user (or the target object) cannot be estimated, and the fake fingerprint determination based on the color is not performed.

In a light sensor PS according to an embodiment of the disclosure, since the opening OP is formed in the first optical filter IRF in correspondence with the second area A2, a portion of the sensor module SM positioned in the second area A2 senses the second light L2 including the light of the wavelength of about 600 nm or more (for example, red light) or about 500 nm or more. Therefore, although some noise is included, the ratio of the light of the long wavelength may be calculated based on a light amount of the third light L3 in the first area A1 and the second light L2 in the second area A2. The color of the finger of the user (or the target object) may be estimated based on the ratio, and the fake fingerprint determination may be performed based on the ratio of the light of the long wavelength or the estimated color. In addition, since the area of the second area A2 is very small compared to the area of the first area A1, the accuracy of the fingerprint sensing is not reduced. In an embodiment, the ratio is a ratio of light of a certain wavelength range (e.g., 600 nm or more) to light below that certain wavelength range (e.g., below 600 nm). Since the second area A2 does not block light of the certain wavelength range, light of a wavelength below the certain wavelength such as green and blue light and light of the certain wavelength such as red light may pass through the second area A2. Since the first area A1 blocks light of the certain wavelength, only light below the certain wavelength such as green and blue light may pass through the first area A1. Subtracting amounts of green and blue light passing through the first area A1 from amounts of the red, green, and blue light passing through the second area A2 may result in an amount of red light of the certain wavelength range. A ratio of the amount of red light to a sum of the amounts of green and blue light can then be used to determine whether a sensed fingerprint is a fake fingerprint.

Meanwhile, first, second, third, and fourth adjacent areas A_ADJ1, A_ADJ2, A_ADJ3, and A_ADJ4 of FIG. 4A are described later with reference to FIGS. 8A and 8B.

As described above, the sensor module SM may include the first area A1 and the second area A2 in the plan view, and the first optical filter IRF overlaps the first area A1 and does not overlap the second area A2. Therefore, it may be determined whether the sensed fingerprint is the fake fingerprint based on the first sensing signal corresponding to the first area A1 where the light of the first wavelength range is blocked and the second sensing signal corresponding to the second area A2 through which the light of the first wavelength range is transmitted.

Meanwhile, a disposition position of the openings OP shown in FIG. 4A and a stack structure of the light sensor PS shown in FIG. 4B are exemplary, and the light sensor PS is not limited thereto. Various embodiments of the light sensor PS are described with reference to FIGS. 5A to 7C.

Figure 5A:
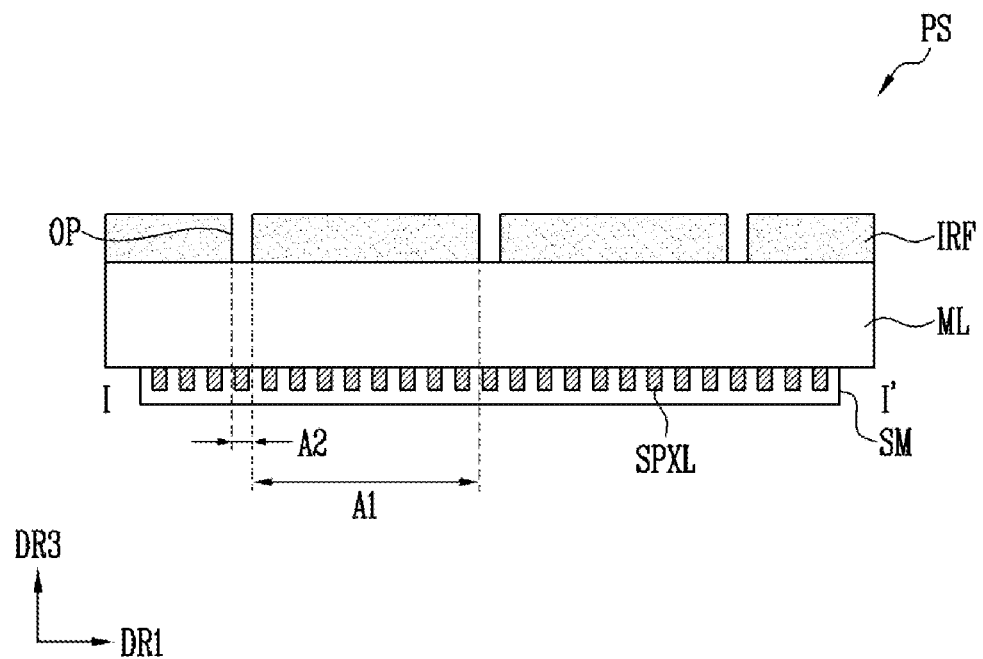
FIGS. 5A, 5B, and 5C are cross-sectional views illustrating various examples of the light sensor taken along the line I-I' of FIG. 4A.
Figure 5B:
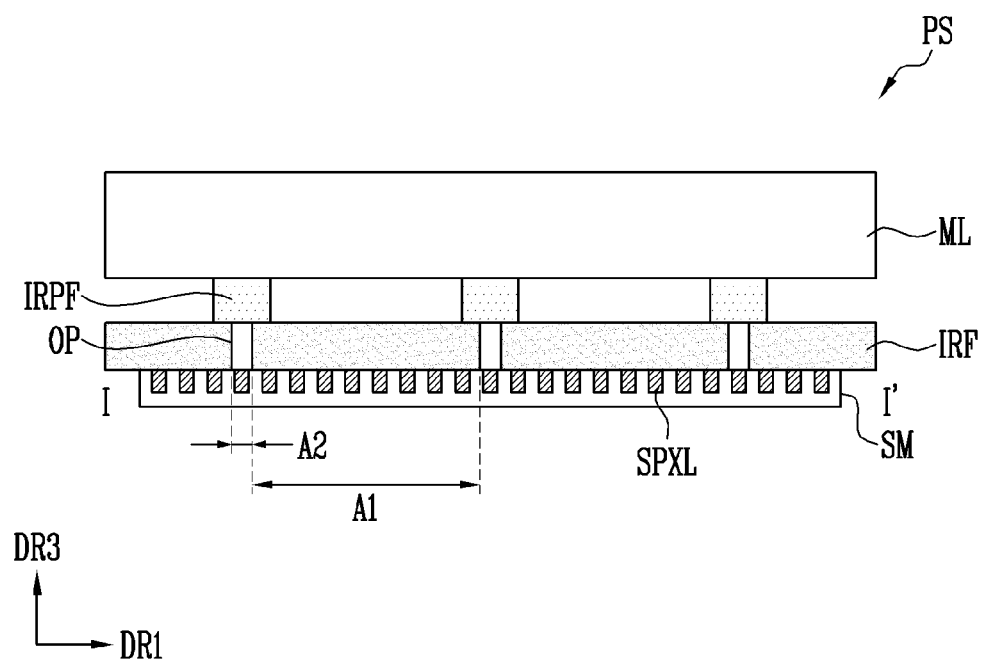
Figure 5C:
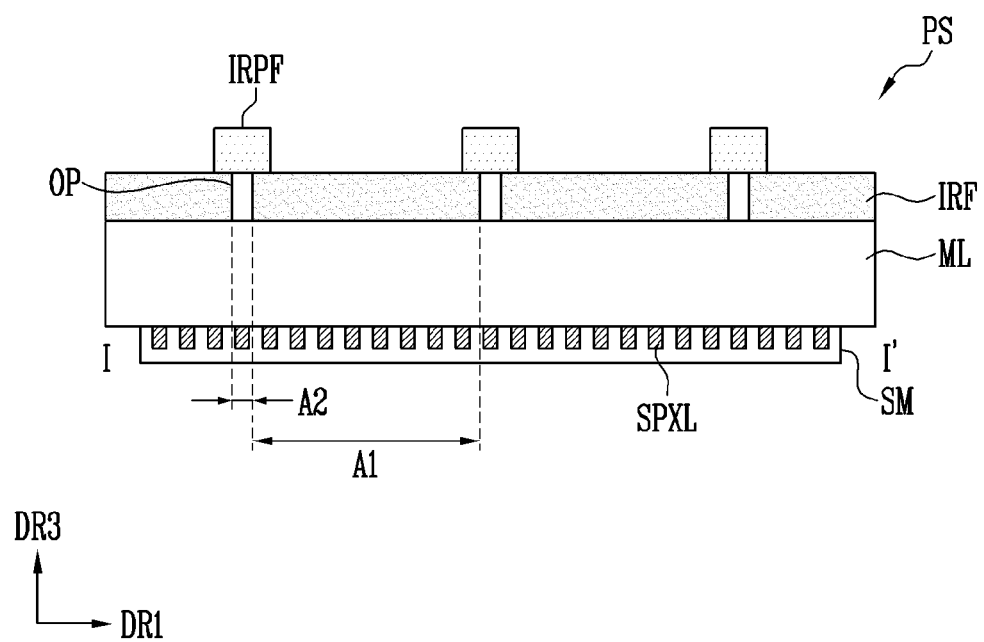

FIGS. 5A, 5B, and 5C are cross-sectional views illustrating various examples of the light sensor taken along the line I-I' of FIG. 4A. FIGS. 5A, 5B, and 5C are diagrams corresponding to FIG. 4B.

Referring to FIGS. 4A, 4B, 5A, 5B, and 5C, since each of the light sensors PS shown in FIGS. 5A, 5B, and 5C is substantially the same as or similar to the light sensor PS of FIG. 4B except for the disposition position of the optical lens ML and the second optical filter IRPF, repetitive description is omitted.

As shown in FIG. 5A, the optical lens ML is disposed between the first optical filter IRF and the sensor module SM.

The optical lens ML is disposed on the sensor module SM, and the first optical filter IRF is disposed on the optical lens ML. The first optical filter IRF may be formed on or applied to the optical lens ML through a deposition process, and may be implemented in a separate film form and attached to an upper surface of the optical lens ML.

As shown in FIG. 5B, the light sensor PS further includes a second optical filter IRPF. The second optical filter IRPF is disposed between the optical lens ML (or the display panel 100 shown in FIG. 4C) and the sensor module SM. The second optical filter IRPF entirely overlaps the second area A2 and partially overlaps the first area A1. In an embodiment, the portions of the second optical filter IRPF shown in FIG. 5B as overlapping the first area A1 are omitted.

The second optical filter IRPF transmits only the light of the first wavelength range of the first optical filter IRF. In an embodiment, the second optical filter IRPF transmits only the light of the long wavelength of about 600 nm or more or about 500 nm or more. For example, the second optical filter IRPF blocks light having a wavelength below the long wavelength.

In this case, a portion of the sensor module SM positioned in the second area A2 senses only the light of the long wavelength of about 600 nm or more or about 500 nm or more. In a structure of FIG. 4B, a difference calculation between the second sensing signal corresponding to the second area A2 and the first sensing signal corresponding to the first area A1 is used to calculate the ratio. For example, the first sensing signal may be subtracted from the second sensing signal to generate a result, and the ratio may be determined from a ratio of the result to the first sensing signal. On the other hand, in a structure of FIG. 5B, an operation for calculating the light amount of the long wavelength may be unnecessary, and a process for the fake fingerprint determination may be more simplified. In an embodiment, the ratio is calculated by dividing an amount of light passing through the second area A2 of FIG. 5B by an amount of light passing through the first area A1 of FIG. 5B, and a sensed fingerprint may be determined to be a fake or authentic based on the ratio.

Meanwhile, the second optical filter IRPF may also be applied to the light sensor PS of FIG. 5A. As shown in FIG. 5C, the optical lens ML, the first optical filter IRF, and the second optical filter IRPF are sequentially stacked on the sensor module SM.

In FIGS. 5B and 5C, while the second optical filter IRPF is disposed on a layer different from that of the first optical filter IRF, the second optical filter IRPF is not limited thereto. For example, the second optical filter IRPF may be formed in the opening OP of the first optical filter IRF. As another example, the second optical filter IRPF may be disposed between the first optical filter IRF and the sensor module SM, or may be disposed on the optical lens ML. That is, when the second optical filter IRPF is disposed to overlap the second area A2 of the sensor module SM, the second optical filter IRPF may be freely disposed on the sensor module SM. In an embodiment, the portions of the second optical filter IRPF shown in FIG. 5C as overlapping the first area A1 are omitted.

Figure 6A:
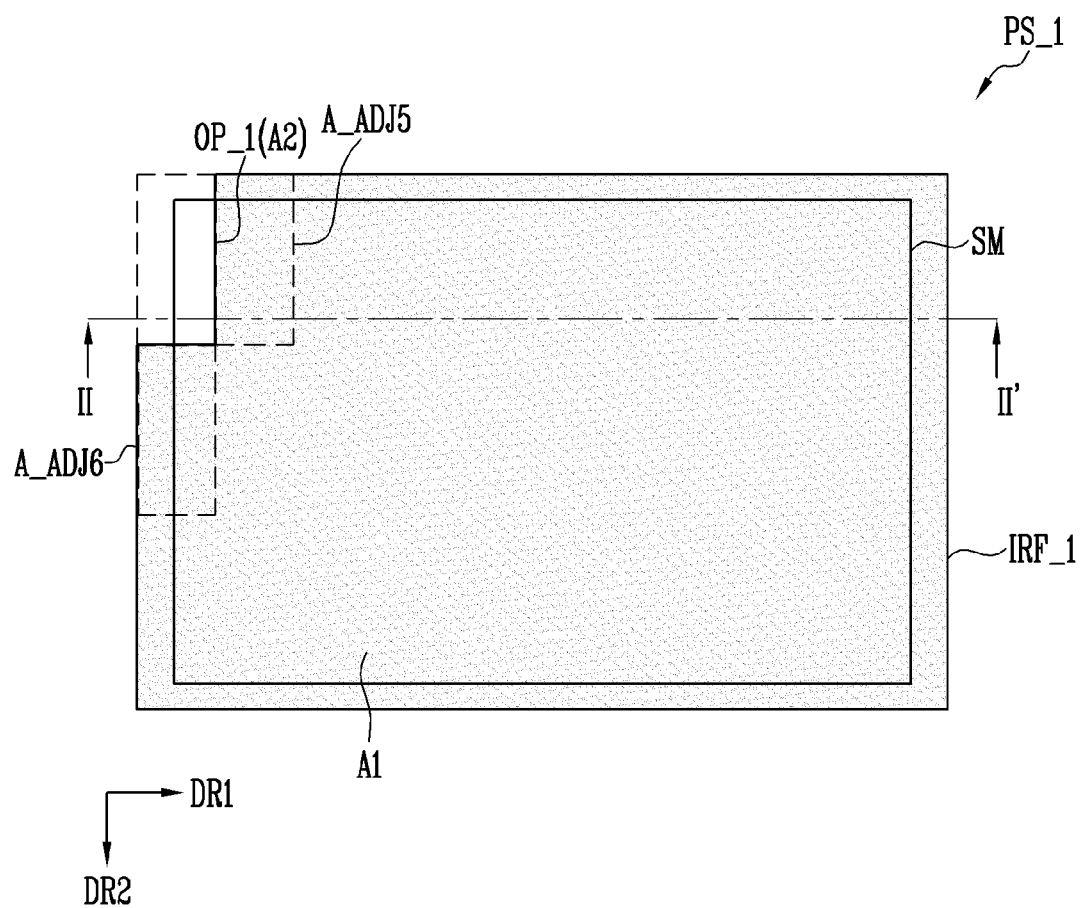
FIG. 6A is a plan view illustrating another example of the light sensor included in the display device of FIG. 1A.
Figure 6B:
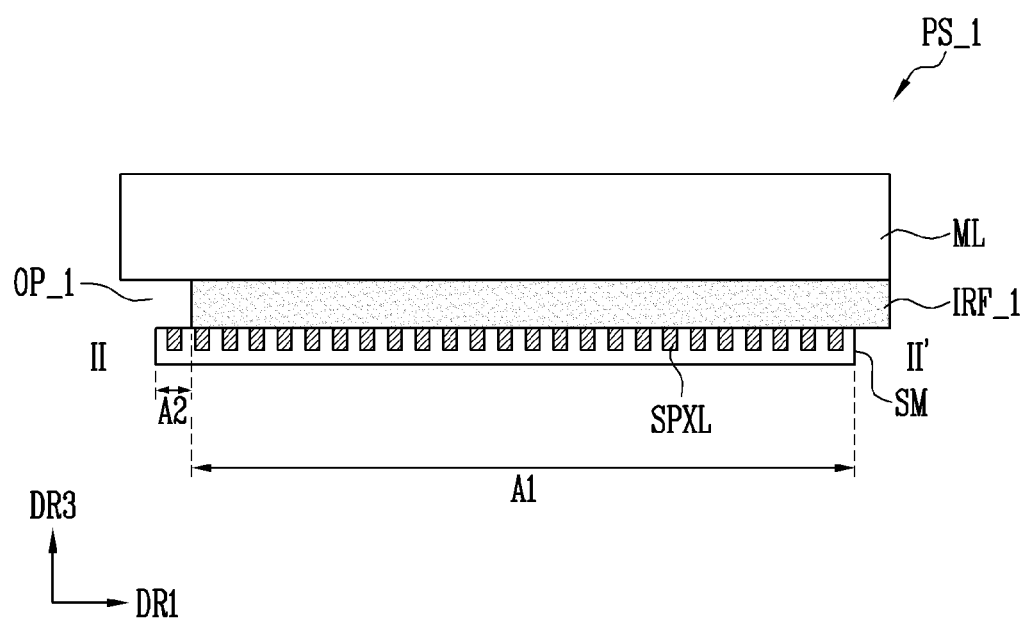
FIGS. 6B and 6C are cross-sectional views illustrating an example of the light sensor taken along a line II-II' of FIG. 6A.
Figure 6C:
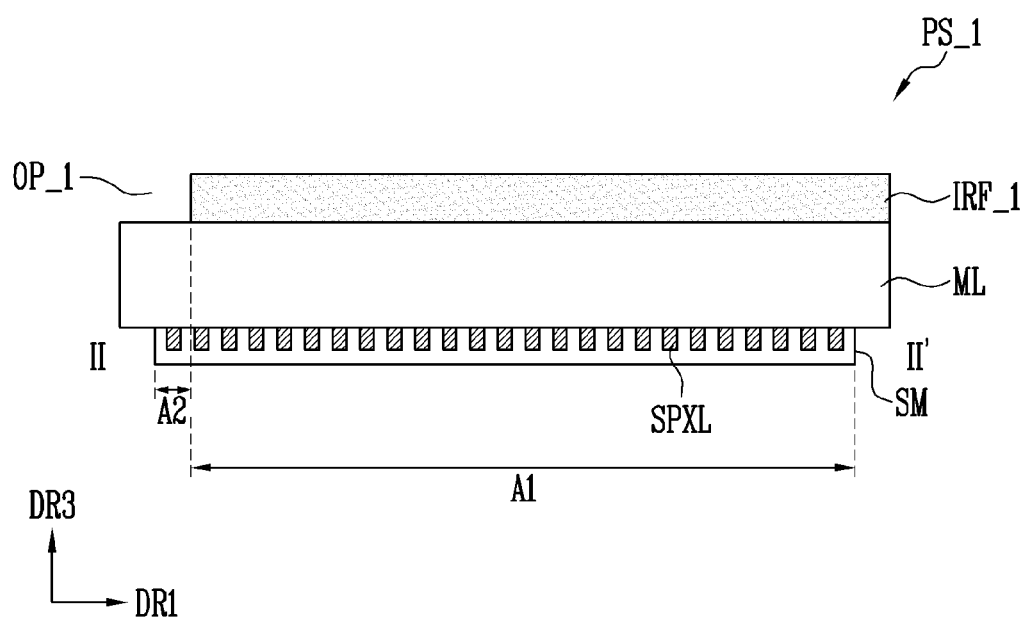

FIG. 6A is a plan view illustrating another example of the light sensor included in the display device of FIG. 1A. Specifically, FIG. 6A shows an example of the light sensor PS_1 provided in the fingerprint sensing area FSA of the display device 1000 shown in FIGS. 1A and 1B. FIGS. 6B and 6C are cross-sectional views illustrating an example of the light sensor taken along a line II-II' of FIG. 6A.

Referring to FIGS. 1A, 4A, 4B, 6A, 6B, and 6C, since the light sensor PS_1 of FIGS. 6A, 6B, and 6C is substantially the same as or similar to the light sensor PS of FIGS. 4A and 4B except for a position of the second area A2 or the opening OP_1, repetitive description is omitted.

The sensor module SM includes the first area A1 and the second area A2 in the plan view, and the second area A2 is positioned on one side of the first area A1. As shown in FIG. 6A, the second area A2 is positioned at an edge of the first area A1 or at a corner of the first area A1.

When the size in the plan view of the light sensor PS_1 is relatively small, for example, when the light sensor PS_1 is smaller than a size of 1 cm×1 cm, in order to prevent accuracy of fingerprint authentication performed based on the first sensing signal corresponding to the first area A1 from being reduced, the second area A2 may be positioned adjacent to the edge of the first area A1 (or the fingerprint sensing area FSA, see FIG. 1A).

An opening OP_1 corresponding to the second area A2 may be formed in a first optical filter IRF_1.

In an embodiment, the opening OP_1 is formed to be larger than the second area A2. As described above, the first optical filter IRF_1 covers the sensor module SM in the plan view, and protrudes from an edge of the sensor module SM in the first direction DR1 and the second direction DR2. The opening OP_1 may protrude further outward or may be formed to be larger so that a portion of the sensor module SM corresponding to the second area A2 may sufficiently receive the light of the long wavelength. In particular, as shown in FIG. 6A, when the opening OP_1 is positioned at a corner of the first optical filter IRF_1, the light of the long wavelength may be more sufficiently incident on the second area A2 of the sensor module SM, compared to a case where the opening OP_1 is positioned in a middle of one side of the first optical filter IRF_1. Therefore, the ratio of light of the long wavelength is more accurately calculated, the color of the sensed fingerprint is more accurately estimated, and the fake fingerprint determination is more accurately performed based on the ratio and the color.

In an embodiment, as shown in FIG. 6B, the first optical filter IRF_1 is disposed on the sensor module SM and disposed under the optical lens ML. In another embodiment, as shown in FIG. 6C, the first optical filter IRF_1 is disposed on the optical lens ML.

Meanwhile, although not shown, as described with reference to FIGS. 5B and 5C, the light sensor PS_1 may further include the second optical filter IRPF.

Fifth and sixth adjacent areas A_ADJ5 and A_ADJ6 of FIG. 6A are described later with reference to FIGS. 8A and 8B.

In FIGS. 6A and 6B, only one opening OP_1 is formed in the first optical filter IRF_1, but this is exemplary, and the first optical filter IRF_1 is not limited thereto. For example, a plurality of openings OP_1 may be formed in correspondence with corners of the first optical filter IRF_1.

Figure 7A:
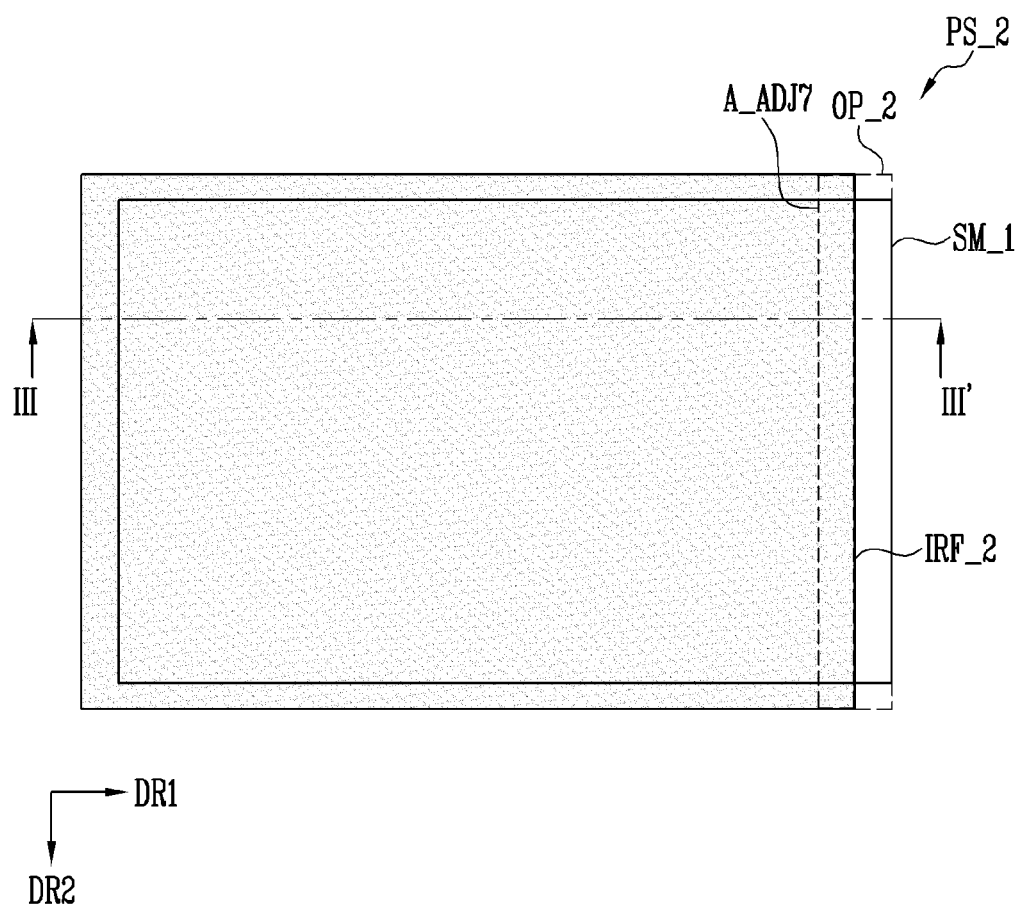
FIG. 7A is a plan view illustrating another example of the light sensor included in the display device of FIG. 1A.
Figure 7B:
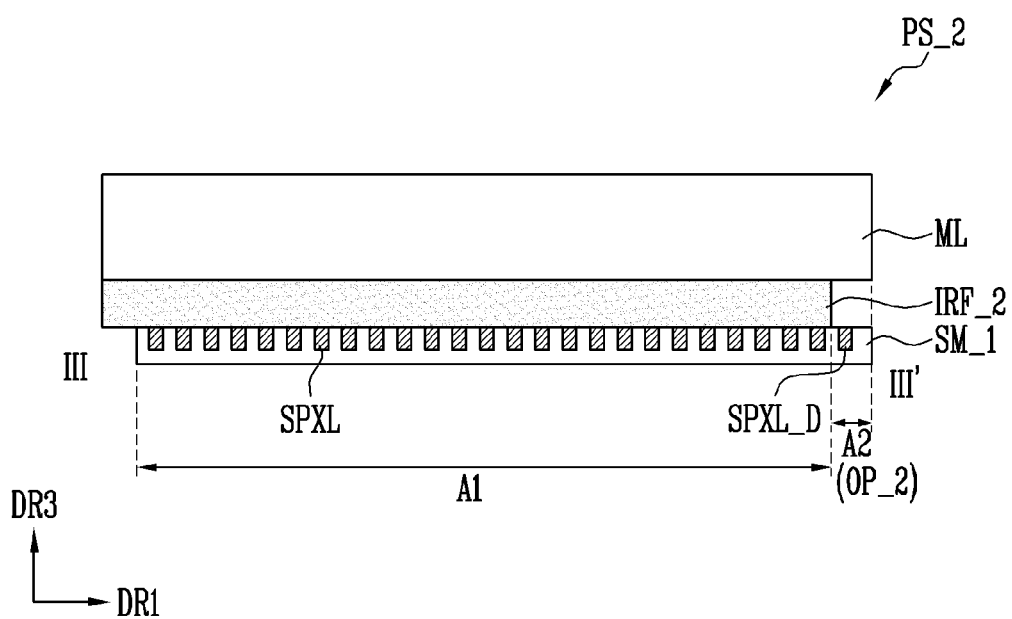
FIGS. 7B and 7C are cross-sectional views illustrating an example of the light sensor taken along a line III-III' of FIG. 7A.
Figure 7C:
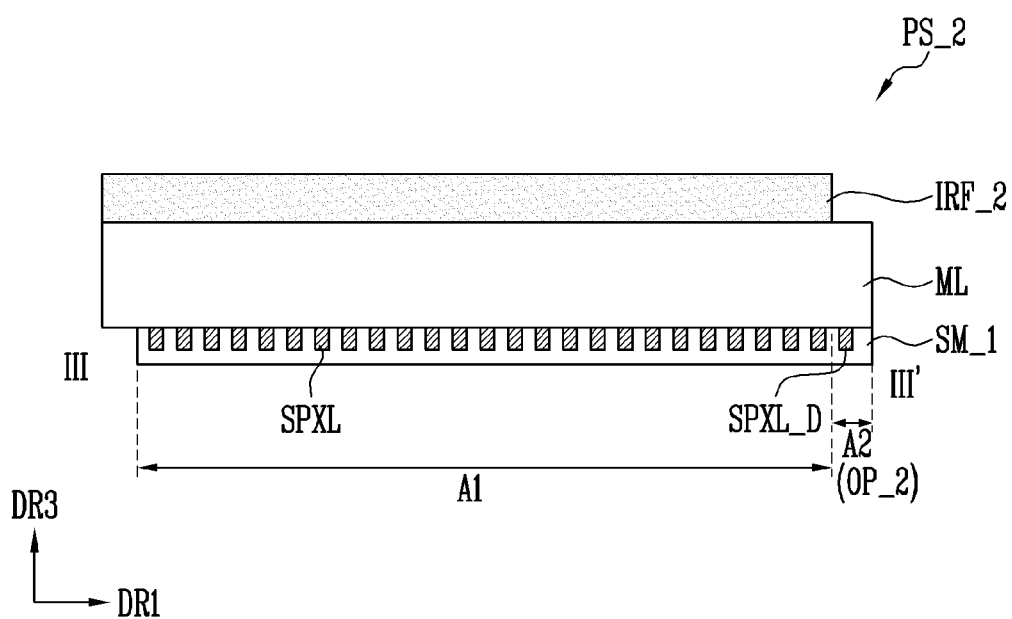

FIG. 7A is a plan view illustrating another example of the light sensor included in the display device of FIG. 1A. Specifically, FIG. 7A shows an example of the light sensor PS_2 provided in the fingerprint sensing area FSA of the display device 1000 shown in FIGS. 1A and 1B. FIGS. 7B and 7C are cross-sectional views illustrating an example of the light sensor taken along a line III-III' of FIG. 7A.

Referring to FIGS. 1A, 4A, 4B, 7A, 7B, and 7C, since the light sensor PS_2 of FIGS. 7B and 7C is substantially the same as or similar to the light sensor PS of FIGS. 4A and 4B except for positions of a sensor module SM_1 and the second area A2 (or an opening OP_2), repetitive description is omitted.

The sensor module SM_1 includes the first area A1 and the second area A2 in the plan view, and the second area A2 is positioned on one side of the first area A1. As shown in FIG. 7A, the second area A2 is positioned on one side of the first area A1. In this case, the sensor module SM_1 includes the sensor pixel SPXL provided in the first area A1 and a dummy sensor pixel SPXL_D provided in the second area A2.

In an embodiment, the dummy sensor pixel SPXL_D is a sensor pixel that does not contribute to a fingerprint image generation when a fingerprint image for the sensed fingerprint is generated. For example, when the fingerprint image is expressed in a grid pattern by the pinhole PIH described with reference to FIG. 2B (or when an actual image is locally inverted based on the pinhole PIH and a grid image is generated), the dummy sensor pixel SPXL_D may be a sensor pixel that does not contribute to the grid pattern. In an embodiment, the dummy sensor pixel SPXL_D is disposed on the outermost side of the sensor module SM. In this case, an area where the dummy sensor pixel SPXL_D is disposed is defined as the second area A2.

The opening OP_2 corresponding to the second area A2 is formed in a first optical filter IRF_2. In an embodiment, the sensor module SM_1 protrudes more in the first direction DR1 than the first optical filter IRF_2 in the plan view, and the dummy sensor pixel SPXL_D is exposed, by the opening OP_2. Meanwhile, the optical lens ML may be disposed to overlap the second area A2 to condense light directed to the dummy sensor pixel SPXL_D.

In a case of the light sensor PS of FIG. 4A, since some of the sensor pixels SPXL detect the light of the long wavelength and the dummy sensor pixels SPXL_D do not detect the light of the long wavelength, in the worst case, for example, when one feature point of the sensed fingerprint corresponds to the opening OP of FIG. 4A, one feature point may not be detected. In this case, the accuracy of the fingerprint authentication may be slightly reduced. In contrast, in a case of the light sensor PS_2 of FIG. 7A, since the dummy sensor pixel SPXL_D, which does not substantially contribute to the fingerprint image generation, senses the light of the long wavelength, the dummy sensor pixel SPXL_D does not affect the accuracy of the fingerprint authentication at all.

In an embodiment, as shown in FIG. 7B, the first optical filter IRF_2 is disposed on the sensor module SM and disposed under the optical lens ML. In another embodiment, as shown in FIG. 7C, the first optical filter IRF_2 is disposed on the optical lens ML.

Meanwhile, although not shown, as described with reference to FIGS. 5B and 5C, the light sensor PS_2 may further include the second optical filter IRPF.

A seventh adjacent area A_ADJ7 of FIG. 7A is described later with reference to FIGS. 8A and 8B.

Figure 8A:
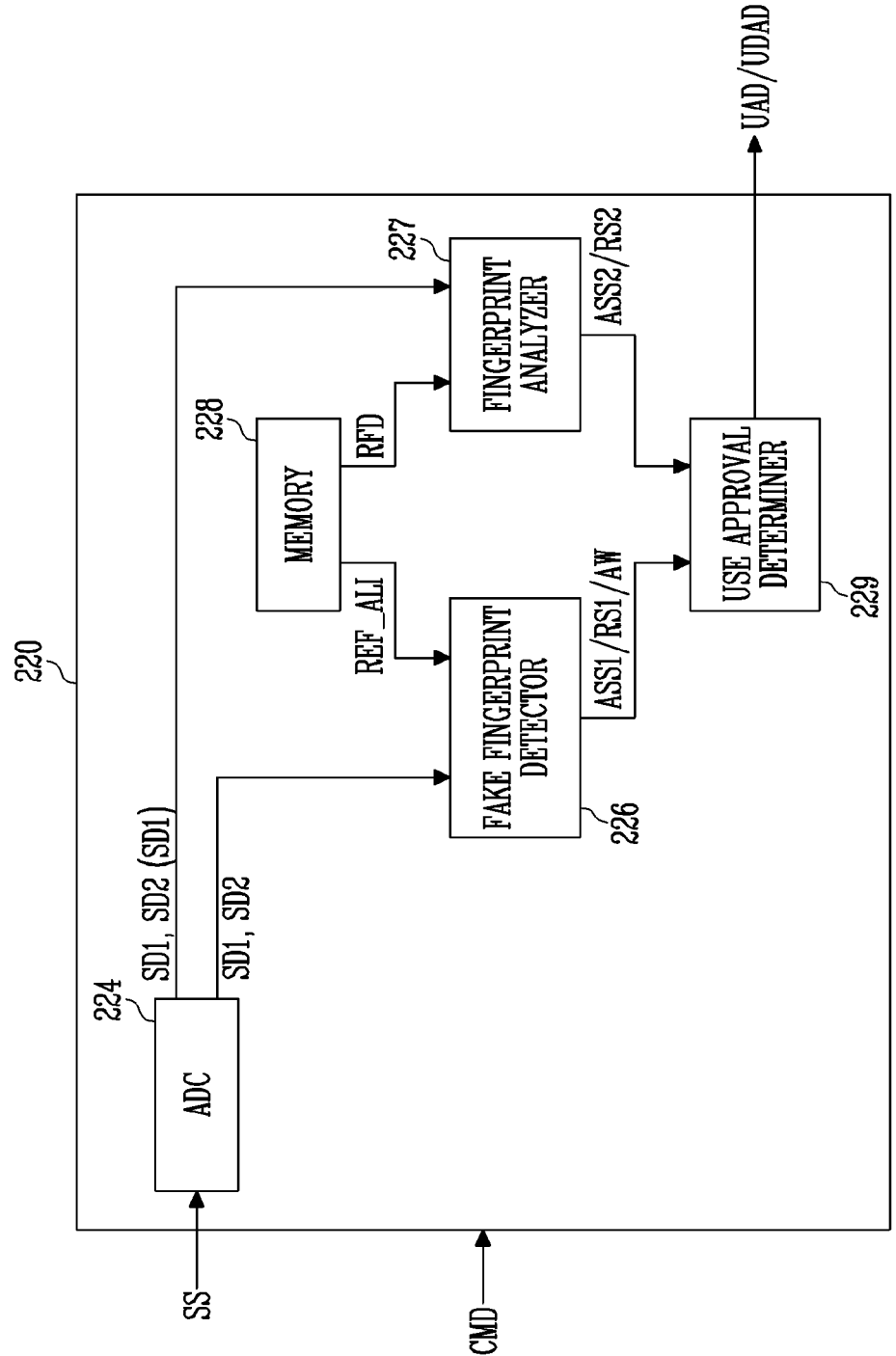

FIGS. 8A and 8B are block diagrams illustrating an example of the fingerprint detector included in the display device of FIG. 1A. FIG. 9 is a diagram illustrating a lookup table for describing a reference range used in the fingerprint detector of FIGS. 8A and 8B.

Referring to FIGS. 1A, 1B, 8A, and 8B, the fingerprint detector 220 includes a fake fingerprint detector 226 and a fingerprint analyzer 227 (e.g., an analysis circuit).

In an embodiment, the fingerprint detector 220 further includes a memory 228 (or memory device) and a use approval determiner 229 (e.g., a determination circuit).

The fingerprint detector 220 may perform fingerprint authentication and/or a fake fingerprint determination in response to a fingerprint sensing command CMD provided from the outside.

In an embodiment, the fingerprint detector 220 further includes the analog-to-digital converter 224 described with reference to FIG. 3A. The analog-to-digital converter 224 may convert the sensing signal SS of an analog format into sensing data SD1 and SD2 of a digital format. For example, the analog-to-digital converter 224 may convert the first sensing signal corresponding to the first area A1 into first sensing data SD1 and convert the second sensing signal corresponding to the second area A2 into second sensing data SD2.

The fake fingerprint detector 226 receives first sensing data SD1 and second sensing data SD2. In addition, the fake fingerprint detector 226 may receive a reference range REF_ALl for the ratio of the light of the long wavelength from the memory 228.

Referring to FIG. 9, a lookup table LUT may include a light amount of red light, a light amount of green light, a light amount of blue light, and a ratio of the red light for each color of the target object. When the light emitting element layer LDL described with reference to FIG. 4C includes a red pixel, a green pixel, and a blue pixel, the light amount of the red light may represent a light amount of light emitted from the red pixel and reflected by the target object, the light amount of the green light may represent a light amount of light emitted from the green pixel and reflected by the target object, the light amount of the blue light may represent a light amount of light emitted from the blue pixel and reflected by the target object. The ratio of the red light may be defined as a ratio of the light amount of the red light to a total light amount of the green light and the blue light. When the first optical filter IRF described with reference to FIG. 4A blocks the light of the long wavelength of about 600 nm or more, the total light amount of the green light and the blue light may correspond to the light amount of the third light L3 (see FIG. 4C) sensed by the sensor pixel SPXL in the first area A1, and the light amount of the red light may correspond to a result of a difference calculation of the light amount of the third light L3 from the light amount of the second light L2 (see FIG. 4C) sensed by the sensor pixel SPXL in the second area A2.

That is, the ratio of the red light may represent the ratio of the light of the long wavelength. The ratio of the light of the long wavelength may be defined as the ratio of light amount of the light of the long wavelength (for example, the light of a wavelength of about 600 nm or more) to a total light amount of light of a short wavelength (for example, light of a wavelength of about 600 nm or less) except for the light of the long wavelength.

As shown in FIG. 9, in a case of a dark skin, the ratio of the light of the long wavelength may be about 0.766667, and in a case of a light skin, the ratio of the light of the long wavelength may be about 0.692857. That is, the ratio of the light of the long wavelength for the actual fingerprint may be in a range of about 0.6 to about 0.8. In this case, the reference range REF_ALI for the ratio of the light of the long wavelength is set to about 0.6 to about 0.8, where a lower limit value of the reference range REF_ALI is about 0.6, and an upper limit value of the reference range REF_ALI is about 0.8. Meanwhile, ratios of the light of the long wavelength for blue, green, white, and black may be 0.2654, 0.31674, 0.50103, and 0.5, respectively, and may fall within a range less than about 0.6. As will be described later, a target object having a color of blue, green, white, or black in which the ratios of the light of the long wavelength are less than the lower limit value (for example, 0.6) of the reference range REF_ALI may be determined or decided as the fake fingerprint. In addition, the ratios of the light of long wavelength for red and yellow may be 1.535088 and 1.004348, respectively, and may fall within a range greater than about 1.0. As will be described later, a target object having a color of red or yellow in which ratios of the light of the long wavelength are greater than the upper limit value (for example, 0.8) of the reference range REF_ALI may be determined or decided as the fake fingerprint.

For reference, the lookup table LUT shown in FIG. 9 may be generated under a condition in which the external light L_IR described with reference to FIG. 4C is not present. Therefore, when the external light L_IR is present, noise by the external light L_IR may increase, and the ratio of the light of the long wavelength may increase as a whole. For example, the ratio of the light of the long wavelength may increase by about 0.1 to 0.2 according to an intensity of the external light L_IR. Accordingly, the reference range REF_ALI for the ratio of the light of the long wavelength may be set to about 0.7 to about 1.0. That is, the reference range REF_ALI may vary according to the intensity of the external light L_IR. In an embodiment, the lookup table LUT is stored in a memory device of the driver 200 and accessible by the driver 200 to determine which color the calculated ratio corresponds to.

Therefore, according to an embodiment, a plurality of lookup tables LUT may be set for each different intensity of the external light L_IR. In this case, a specific lookup table LUT may be selected in correspondence with the intensity of the external light L_IR sensed through an external illuminance sensor (or an infrared sensor), the reference range REF_ALI may be set based on the selected lookup table LUT, and the set reference range REF_ALI may be provided from the memory 228 to the fake fingerprint detector 226.

However, the disclosure is not limited thereto. For example, the fake fingerprint detector 226 may receive a preset reference range REF_ALI, and vary the reference range REF_ALI based on information on the intensity of the external light L_IR provided from the outside. As another example, the reference range REF_ALI may be set relatively wide including a margin corresponding to the external light L_IR, or only the lower limit value of the reference range REF_ALI may be set.

Meanwhile, the ratio of the light of the long wavelength for each of the other colors, which are not described, is shown in FIG. 9, and thus description thereof is omitted.

In an embodiment, the reference range REF_ALI is stored for each user when the display device 1000 is initially set. In another embodiment, the reference range REF_ALI is stored in the memory 228 through analysis of the sensing data SD1 and SD2 for a fingerprint sensed when the fingerprint of the user is registered.

The fake fingerprint detector 226 may calculate the ratio of the light of the long wavelength based on the first sensing data SD1 and the second sensing data SD2.

In an embodiment, the fake fingerprint detector 226 calculates the ratio of light of the long wavelength by comparing the second sensing data SD2 with a portion of the first sensing data SD1 adjacent to the second sensing data SD2.

Referring to FIG. 4A, for example, the fake fingerprint detector 226 compares the second sensing data SD2 corresponding to the second area A2 (that is, the light amount in the second area A2) with a portion of the first sensing data SD1 corresponding to at least one of the first to fourth adjacent areas A_ADJ1 to A_ADJ4 adjacent to the second area A2 (that is, a light amount in at least one of the first to fourth adjacent areas A_ADJ1 to A_ADJ4). Here, each of the first to fourth adjacent areas A_ADJ1 to A_ADJ4 may have the same size as the second area A2 and may be adjacent to the second area A2 in horizontal and vertical directions, respectively. For example, the fake fingerprint detector 226 may exclude an adjacent area having the largest light amount and an adjacent area having the smallest light amount among the light amounts respectively corresponding to the first to fourth adjacent areas A_ADJ1 to A_ADJ4, extract a portion of the first sensing data SD1 corresponding to the remaining adjacent areas (or an average thereof), and compare the second sensing data SD2 with the extracted portion of the first sensing data SD1.

Referring to FIG. 6A, for example, the fake fingerprint detector 226 compares the second sensing data SD2 corresponding to the second area A2 (that is, the light amount of the second area A2) with a portion of the first sensing data SD1 corresponding to at least one of the fifth and sixth adjacent areas A_ADJ5 and A_ADJ6 adjacent to the second area A2 (that is, a light amount in at least one of the fifth and sixth adjacent areas A_ADJ5 and A_ADJ6). Here, each of the fifth and sixth adjacent areas A_ADJ5 and A_ADJ6 may have the same size as the second area A2 and may be adjacent to the second area A2 in horizontal and vertical directions, respectively. For example, the fake fingerprint detector 226 may compare the portion of the first sensing data SD1 corresponding to the fifth adjacent area A_ADJ5 or the sixth adjacent area A_ADJ6 with the second sensing data SD2, or compare an average of the portion of the first sensing data SD1 corresponding to the fifth adjacent area A_ADJ5 and the sixth adjacent area A_ADJ6 with the second sensing data SD2.

Referring to FIG. 7A, for example, the fake fingerprint detector 226 compares the second sensing data SD2 corresponding to the second area A2 (that is, the light amount of the second area A2) with a portion of the first sensing data SD1 corresponding to the seventh adjacent area A_ADJ7 adjacent to the second area A2 (that is, a light amount of the seventh adjacent area A_ADJ7). Here, the seventh adjacent area A_ADJ7 may have the same size as the second area A2 and may be closest to the second area A2.

In an embodiment, when the light sensor PS does not include the second optical filter IRPF (see FIG. 5B), the fake fingerprint detector 226 calculates the light amount of the light of the long wavelength by performing a difference calculation between the second sensing data SD2 (or the light amount according to the second sensing data SD2) and the portion of the first sensing data SD1 (or the light amount according to the portion of the first sensing data SD1). In this embodiment, the fake fingerprint detector 226 calculates the ratio of the light of the long wavelength by dividing the light amount of the light of the long wavelength by the portion of the first sensing data SD1 (or an average light amount according to the first sensing data SD1). In another embodiment, when the light sensor PS includes the second optical filter IRPF (see FIG. 5B) overlapping the second area A2, the fake fingerprint detector 226 calculates the ratio of the light of the long wavelength by dividing the second sensing data SD2 (or the light amount according to the second sensing data SD2) by the portion of the first sensing data SD1 (or the light amount according to the portion of the first sensing data SD1).

The fake fingerprint detector 226 may determine whether the sensed fingerprint is the fake fingerprint by comparing the ratio of the light of the long wavelength with the reference range REF_ALI.

When the ratio of the light of the long wavelength is within the reference range REF_ALI, the fake fingerprint detector 226 determines that the sensed fingerprint is the actual fingerprint. In contrast, when the ratio of the light of the long wavelength is outside the reference range REF_ALI, the fake fingerprint detector 226 determines that the sensed fingerprint is the fake fingerprint.

When it is determined that the sensed fingerprint is the actual fingerprint, the fake fingerprint detector 226 may output a first approval signal ASS1. Conversely, when it is determined that the sensed fingerprint is the fake fingerprint, the fake fingerprint detector 226 may output a first rejection signal RS1. The first approval signal ASS1 or the first rejection signal RS1 may be provided to the use approval determiner 229.

In an embodiment, the fake fingerprint detector 226 generates an approval weight AW based on the ratio of the light of the long wavelength for the sensed fingerprint and the reference range REF_ALI. The closer the ratio of the light of the long wavelength is to a range corresponding to a dark skin color or a light skin color (for example, in a range of about 0.69 to 0.77), the higher a probability that the sensed fingerprint is the actual fingerprint. For example, as the ratio of the light of the long wavelength is closer to the range corresponding to the dark skin color or the light skin color, the approval weight AW may increase. The approval weight AW may be provided to the use approval determiner 229.

The fingerprint analyzer 227 may receive the first sensing data SD1 and the second sensing data SD2 or may receive only the first sensing data SD1. In addition, the fingerprint analyzer 227 may receive registered fingerprint data RFD from the memory 228. In an embodiment, the fingerprint analyzer 227 performs fingerprint authentication by comparing the first and second sensing data SD1 and SD2 with the registered fingerprint data RFD. In another embodiment, the fingerprint analyzer 227 performs the fingerprint authentication by comparing only the first sensing data SD1 with the registered fingerprint data RFD. For example, as described with reference to FIG. 7A, when the second sensing data SD2 corresponds to the dummy sensor pixel SPXL_D, the fingerprint analyzer 227 performs the fingerprint authentication by comparing only the first sensing data SD1 with the registered fingerprint data RFD.

In an embodiment, the fingerprint analyzer 227 calculates a match rate between the first and second sensing data SD1 and SD2 (or the first sensing data SD1) and the registered fingerprint data RFD. In an embodiment, the fingerprint analyzer 227 generates a fingerprint image corresponding to the first and second sensing data SD1 and SD2 (or the first sensing data SD1) through image processing, and performs the fingerprint authentication by comparing the generated fingerprint image with a fingerprint image of the registered fingerprint data RFD (that is, a registered fingerprint image). However, this is exemplary, and a method of performing the fingerprint authentication may be implemented by various fingerprint recognition methods, and the fingerprint analyzer 227 may include a hardware configuration and/or a software configuration for performing these other methods.

When the match rate is equal to or greater than a preset threshold value, the fingerprint analyzer 227 determines that the sensed fingerprint matches the registered fingerprint data RFD. When the match rate is less than the threshold value, the fingerprint analyzer 227 determines that the sensed fingerprint does not match the registered fingerprint data RFD.

When it is determined that the sensed fingerprint matches the registered fingerprint data RFD, the fingerprint analyzer 227 may output a second approval signal ASS2. Conversely, when it is determined that the sensed fingerprint does not match the registered fingerprint data RFD, the fingerprint analyzer 227 may output a second rejection signal RS2. The second approval signal ASS2 or the second rejection signal RS2 may be provided to the use approval determiner 229.

The use approval determiner 229 may determine whether to approve a final use of the display device 1000 based on a result of determining the fake fingerprint and a result of the fingerprint authentication. In an embodiment, when the first approval signal ASS1 and the second approval signal ASS2 are generated, the use approval determiner 229 may output a use approval signal UAD to the panel driver 210 and/or an external processor. An execution of the display device 1000 or a corresponding application may be approved based on the use approval signal UAD.

In an embodiment, when at least one of the first rejection signal RS1 and the second rejection signal RS2 is generated, the use approval determiner 229 may output a use disapproval signal UDAD to the panel driver 210 and/or the external processor. The display device 1000 or a corresponding application is not executed based on the use disapproval signal UDAD.

In an embodiment, the fake fingerprint detector 226 generates the approval weight AW rather than the first approval signal ASS1 and the first rejection signal RS1. The use approval determiner 229 receiving the approval weight AW and the second approval signal ASS2 determines whether to approve a use according to a size of the approval weight AW. When the use approval determiner 229 receives the second rejection signal RS2, the use approval determiner 229 may output the use disapproval signal UDAD regardless of the size of the approval weight AW.

Meanwhile, in FIG. 8A, the first approval signal ASS1, the first rejection signal RS1, and the approval weight AW are provided to the use approval determiner 229, but are not limited thereto.

As shown in FIG. 8B, the first approval signal ASS1, the first rejection signal RS1, and the approval weight AW may be provided to the fingerprint analyzer 227.

In this case, the fingerprint analyzer 227 performs the fingerprint authentication based on the first approval signal ASS1, the first rejection signal RS1, or the approval weight AW. For example, when the fingerprint analyzer 227 receives the first approval signal ASS1, the fingerprint analyzer 227 performs the fingerprint authentication. As another example, when the fingerprint analyzer 227 receives the first rejection signal RS1, the fingerprint analyzer 227 does not perform the fingerprint authentication. As still another example, when the fingerprint analyzer 227 receives the approval weight AW, the approval weight AW may be reflected in calculating the match rate.

As described above, the fingerprint detector 220 (the fingerprint authentication device FDD, or the display device 1000) may detect the fake fingerprint by calculating the ratio of the light of the long wavelength based on the first sensing data SD1 corresponding to the first area A1 and the second sensing data SD2 corresponding to the second area A2. Accordingly, accuracy and reliability of fingerprint detection may be improved without an increase of a manufacturing cost and/or an additional configuration.

Figure 10:
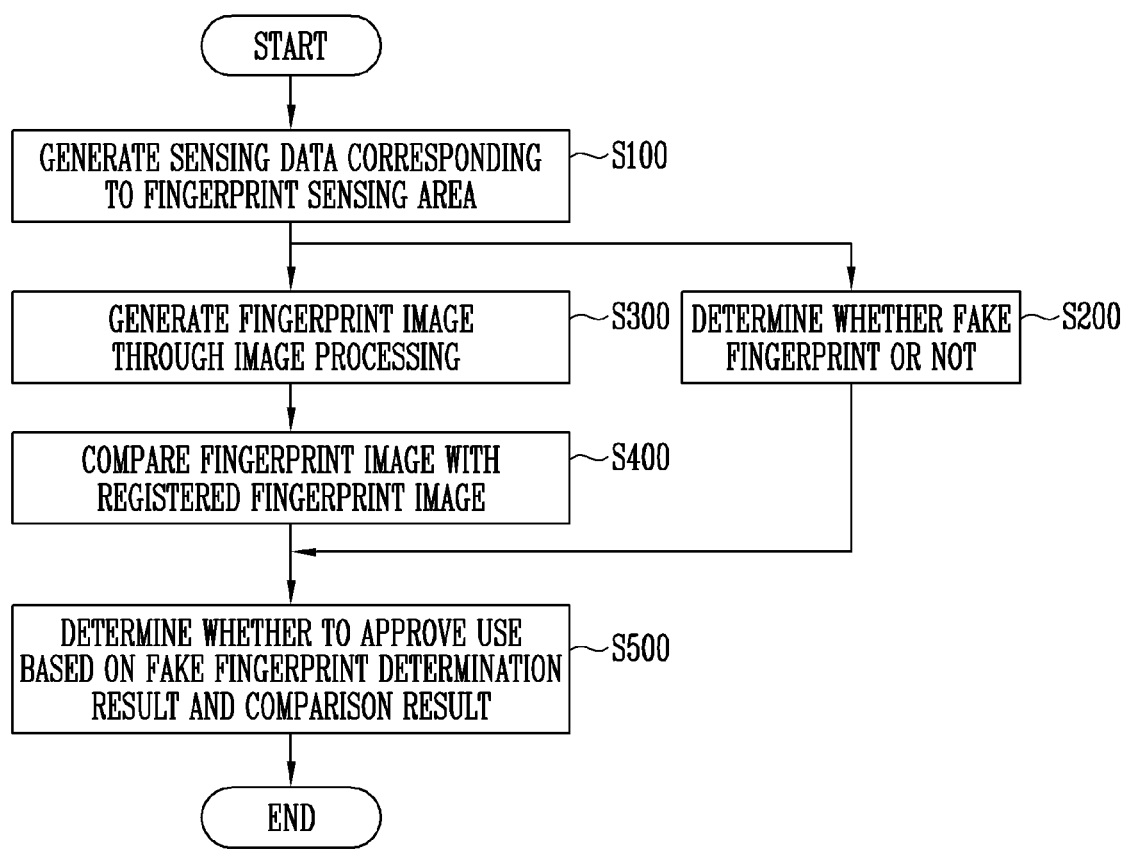
FIG. 10 is a flowchart illustrating a fingerprint authentication method according to an embodiment of the disclosure.
Figure 11:
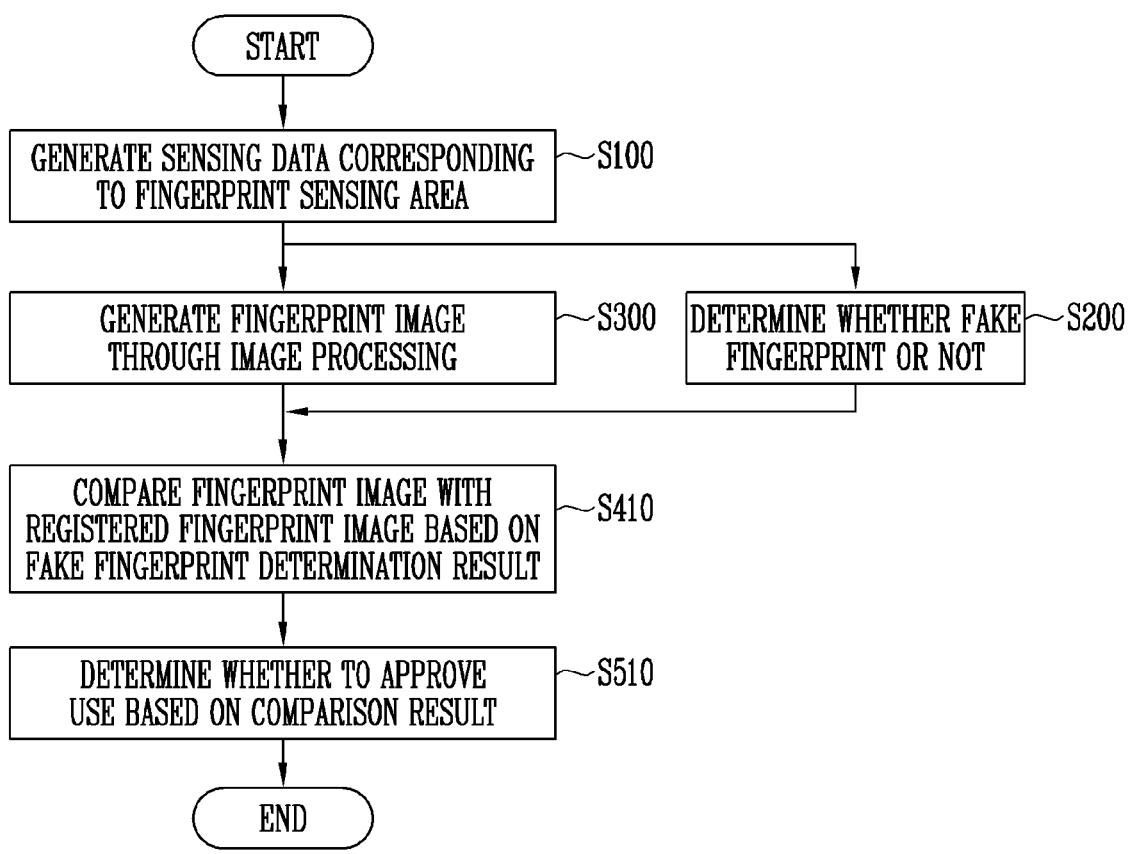
FIG. 11 is a flowchart illustrating an example of a fingerprint authentication method of FIG. 10.

FIG. 10 is a flowchart illustrating a fingerprint authentication method according to an embodiment of the disclosure. FIG. 11 is a flowchart illustrating an example of the fingerprint authentication method of FIG. 10.

Hereinafter, in FIGS. 10 to 13, the same reference numerals are used for components that are the same as or corresponding to the components described above, and repetitive description is omitted.

Referring to FIGS. 1A to 10, the fingerprint authentication method may be performed in the display device 1000 (or the fingerprint authentication device FDD) of FIG. 1A.

The fingerprint authentication method generates the sensing data corresponding to the fingerprint sensing area FSA using the light sensor PS (S100), and determines the fake fingerprint based on the first sensing data corresponding to the first area A1 and the second sensing data corresponding to the second area A2 (S200). In addition, the fingerprint authentication method performs the fingerprint authentication by generating the fingerprint image through image processing on the sensed data (S300) and comparing the fingerprint image with the registered fingerprint image (S400). Thereafter, the fingerprint authentication method determines whether to approve use based on the fake fingerprint determination result and the comparison result (or a fingerprint authentication result) (S500).

Performing the fingerprint authentication (S400) may include calculating the match rate between the sensed data and the registered fingerprint data, and comparing the match rate with a threshold value.

When the match rate is less than the threshold value, it is determined that the sensed fingerprint does not match the registered fingerprint data. When it is determined that the sensed fingerprint does not match the registered fingerprint data, the use of the display device 1000 or a corresponding application may be disapproved.

When the match rate is equal to or greater than the threshold value, it is determined that the sensed fingerprint matches the registered fingerprint data. When it is determined that the sensed fingerprint matches the registered fingerprint data, the use of the display device 1000 or the corresponding application may be approved. That is, when the sensing data and the registered fingerprint data match, and it is determined that the sensed fingerprint is the actual fingerprint, the use may be approved.

As described above, in the method of driving the display device 1000 according to the embodiment of FIG. 10, the fake fingerprint detection and the fingerprint authentication may be performed in parallel by one image acquisition in the fingerprint sensing area FSA. Therefore, an amount of time for performing the fingerprint detection and the use authorization may be shortened.

Meanwhile, as described with reference to FIG. 8A, it has been described that the fingerprint authentication method determines whether to approve use based on the fake fingerprint determination result and the comparison result (or the fingerprint authentication result) (S500), but is not limited thereto.

Referring to FIGS. 11 and 8B, the fingerprint authentication method performs the fingerprint authentication by generating the fingerprint image through image processing on the sensing data (S300) and comparing the fingerprint image with the registered fingerprint image (S410) based on the fake fingerprint determination result, and determines whether to approve use based on the comparison result (or the fingerprint authentication result) (S510).

When it is determined that the sensed fingerprint is the actual fingerprint, the fingerprint authentication step S410 is performed, and when the fingerprint authentication is successfully performed, the use of the display device 1000 or the corresponding application may be authorized.

When it is determined that the sensed fingerprint is the fake fingerprint, the fingerprint authentication step S410 may be omitted, and the use of the display device 1000 or the corresponding application may be disapproved.

As described above, in the method of driving the display device 1000 according to the embodiment of FIG. 11, the fingerprint authentication is performed after determining whether the sensed fingerprint is the fake fingerprint, thereby reducing an operation burden when the fingerprint is detected.

Figure 12:
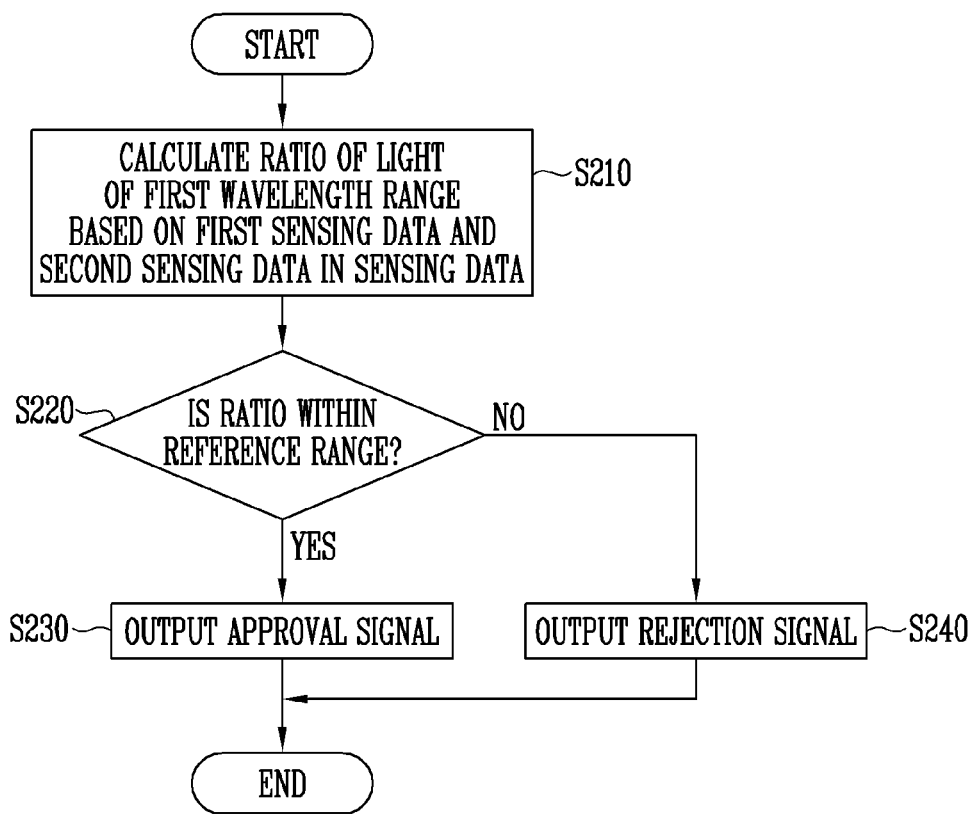
FIG. 12 is a flowchart illustrating another example of the fingerprint authentication method of FIG. 10.
Figure 13:
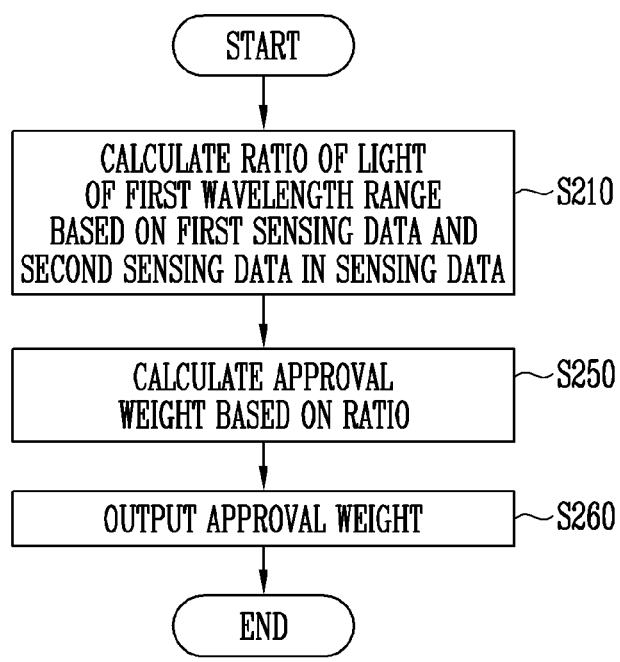
FIG. 13 is a flowchart illustrating still another example of the fingerprint authentication method of FIG. 10.

Meanwhile, a specific operation of the fingerprint authentication method including the fake fingerprint determination may progress as shown in FIGS. 12 and 13.

FIG. 12 is a flowchart illustrating another example of the fingerprint authentication method of FIG. 10.

Referring to FIGS. 1A to 12, first, the sensing data SD1 and SD2 may be generated based on the light sensed from the fingerprint sensing area FSA. The sensing data SD1 and SD2 may include the first sensing data SD1 corresponding to the first area A1 where the light of the first wavelength range is blocked and the second sensing data SD2 corresponding to the second area A2 through which the light of the first wavelength range is transmitted. Here, the light of the first wavelength range may be the light of the long wavelength of about 600 nm or more or about 500 nm or more.

In an embodiment, the fake fingerprint determination step (S300) includes calculating the ratio of the light of the first wavelength range based on the first sensing data SD1 and the second sensing data SD2 (S210).

Thereafter, it is determined whether the ratio of the light of the first wavelength range is within the reference range REF_ALI (S220).

When the ratio of the light of the first wavelength range is within the reference range REF_ALI, it is determined that the sensed fingerprint is the actual fingerprint. In addition, when the ratio of the light of the first wavelength range is outside the reference range REF_ALI, it is determined that the sensed fingerprint is the fake fingerprint.

Thereafter, a signal corresponding to a result of determining whether the sensed fingerprint is the fake fingerprint may be output.

When it is determined that the sensed fingerprint is the actual fingerprint, an approval signal (or the first approval signal ASS1) for approving the use of the display device 1000 or the corresponding application is output (S230).

When it is determined that the sensed fingerprint is the fake fingerprint, a rejection signal (or the first rejection signal RS1) for disapproving the use of the display device 1000 or the corresponding application is output (S240).

FIG. 13 is a flowchart illustrating still another example of the fingerprint authentication method of FIG. 10.

Referring to FIGS. 1A to 11, and 13, in an embodiment, the fake fingerprint determination step (S300) includes calculating the ratio of the light of the first wavelength range based on the first sensing data SD1 and the second sensing data SD2 (S210), calculating the approval weight AW by comparing the ratio of the light of the first wavelength range with the reference range REF_ALI (S250), and outputting the approval weight AW (S260).

When the approval weight AW is equal to or greater than a use approval reference, the use of the display device 1000 or the corresponding application may be approved.

When the approval weight AW is less than the use approval reference, the use of the display device 1000 or the corresponding application may be disapproved.

In a case of the embodiment of FIG. 13, accuracy of the fake fingerprint determination may be further improved.

As described above, the fingerprint authentication device FDD, the display device 1000 including the same, and the fingerprint authentication method according to at least one embodiment of the disclosure may estimate the ratio of the light of the long wavelength or the color of the sensed fingerprint based on the first sensing signal in the first area A1 where the light of the long wavelength is blocked and the second sensing signal in the second area A2 through which the light of the long wavelength is transmitted, and may detect the fake fingerprint based on the ratio or the color. Accordingly, accuracy and reliability of fingerprint detection may be improved without an increase of a manufacturing cost and/or an additional configuration.

Although the disclosure has been described with reference to the embodiments above, those having ordinary skill in the art will understand that the disclosure may be variously modified and changed without departing from the spirit and scope of the disclosure.

What is claimed is:

1. A display device comprising:
   a display panel;
   a sensor device disposed under the display panel, including a first area and a second area in a plan view, and sensing light passing through the display panel;
   a first optical filter disposed between the display panel and the sensor device, overlapping the first area and non-overlapping the second area in the plan view, and blocking visible light of a wavelength greater than a first wavelength;
   a second optical filter disposed between the display panel and the sensor device, overlapping the second area in the plan view, and blocking visible light of a wavelength less than the first wavelength; and
   a detection circuit estimating a color of a sensed fingerprint corresponding to sensing signals provided from the sensor device based on a first sensing signal corresponding to the first area and a second sensing signal corresponding to the second area among the sensing signals and determining whether the sensed fingerprint is a fake fingerprint based on the color of the sensed fingerprint.

2. The display device according to claim 1, wherein the first optical filter blocks the light of a wavelength range of about 600 nm or more.

3. The display device according to claim 1, wherein the first area surrounds the second area in the plan view, and wherein the first optical filter includes at least one opening corresponding to the second area.

4. The display device according to claim 3, wherein the first optical filter includes a plurality of openings corresponding to the second area, and wherein the openings are spaced apart from each other with a first separation distance in the plan view so that at least one of the openings corresponds to the sensed fingerprint.

5. The display device according to claim 4, further comprising:
   an optical lens disposed on the first optical filter and overlapping the first area and the second area in the plan view.

6. The display device according to claim 4, further comprising:
   an optical lens disposed between the first optical filter and the sensor device and overlapping the first area and the second area in the plan view.

7. The display device according to claim 4, wherein the detection circuit calculates a ratio of the visible light of the wavelength greater than the first wavelength based on a first light amount corresponding to the first sensing signal and a second light amount corresponding to the second sensing signal, and determines that the sensed fingerprint is the fake fingerprint when the ratio of the visible light is outside a reference range.

8. The display device according to claim 7, wherein the reference range is varied according to an intensity of external light.

9. The display device according to claim 1, the second optical filter transmitting the visible light of the wavelength greater than the first wavelength.

10. The display device according to claim 9, wherein the detection circuit calculates a ratio of a first light amount of the first sensing signal to a second light amount of the second sensing signal, and determines that the sensed fingerprint is the fake fingerprint when the ratio is outside a reference range.

11. The display device according to claim 1, wherein the second area is positioned at one side of the first area in the plan view, and wherein the first optical filter covers the sensor device in the first area and exposes the sensor device in the second area in the plan view.

12. A fingerprint authentication device comprising:
   a sensor device including a first area and a second area in a plan view and sensing light reflected by a fingerprint;
   a first optical filter disposed on the sensor device, overlapping the first area and non-overlapping the second area in the plan view, and blocking visible light of a wavelength greater than a first wavelength;
   a second optical filter disposed on the sensor device, overlapping the second area in the plan view, and blocking visible light of a wavelength less than the first wavelength; and
   a detection circuit estimating a color of a sensed fingerprint corresponding to sensing signals provided from the sensor device based on a first sensing signal corresponding to the first area and a second sensing signal corresponding to the second area among the sensing signals and determining whether the sensed fingerprint is a fake fingerprint based on the color of the sensed fingerprint.

13. The fingerprint authentication device according to claim 12, wherein the first optical filter blocks the light of a wavelength range of about 600 nm or more.

14. The fingerprint authentication device according to claim 12, further comprising:
an optical lens disposed on the sensor device and overlapping the first area and the second area in the plan view.

15. A method of authenticating a fingerprint performed in a fingerprint authentication device including a sensor device including a first area and a second area in a plan view and sensing light, and a first optical filter disposed on the sensor device, overlapping the first area and non-overlapping the second area in the plan view, and blocking the light of a first wavelength range, the method comprising:
generating sensing data including first sensing data corresponding to the first area and second sensing data corresponding to the second area, through the sensor device;
determining a first light amount from the first sensing data;
determining a second light amount from the second sensing data;
subtracting the first light amount from the second light amount to calculate a third light amount;
determining a ratio from the first and third light amounts; and
determining whether a sensed fingerprint corresponding to the sensing data is a fake fingerprint when the ratio differs from a pre-defined ratio by more than a threshold amount.

16. The method according to claim 15, further comprising:
generating a fingerprint image by performing an image processing on the sensing data;
comparing the fingerprint image with a registered fingerprint image; and
determining whether to approve a function based on the ratio and a comparison result of the comparing.

17. The method according to claim 15, further comprising:
generating a fingerprint image by performing an image processing on the sensing data;
comparing the fingerprint image with a registered fingerprint image based on the ratio; and
determining whether to approve a function based on a comparison result of the comparing.

18. A display device comprising:
a light emitting layer;
an optical lens disposed on the light emitting layer;
an optical filter including a first area configured to block light having a first wavelength greater than a pre-defined threshold wavelength, and a second area configured to permit transmission of light above the first wavelength;
a plurality of first sensor pixels disposed on the optical filter in the first area, and configured to output a first sensing signal;
a plurality of second sensor pixels disposed on the optical filter in the second area, and configured to output a second sensing signal; and
a controller configured to determine whether a sensed fingerprint is a fake based on the first and second sensing signals,
wherein the controller determines a first light amount from the first sensing signal, determines a second light amount from the second sensing signal, subtracts the first light amount from the second light amount to calculate a third light amount, determines a ratio from the first and third light amounts, and determines the sensed fingerprint to be the fake when the ratio differs from a pre-defined ratio by more than a threshold amount.

19. The display device of claim 18, wherein the second area permits transmission of light at and below the first wavelength.

* * * * *